United States Patent
Xu et al.

(10) Patent No.: US 12,316,463 B2
(45) Date of Patent: May 27, 2025

(54) DATA TRANSMISSION METHOD AND APPARATUS FOR A HARQ OPERATION

(71) Applicant: HUAWEI TECHNOLOGIES CO., LTD., Guangdong (CN)

(72) Inventors: Bin Xu, Beijing (CN); Bingzhao Li, Beijing (CN); Lei Chen, Beijing (CN)

(73) Assignee: Huawei Technologies Co., Ltd. (CN)

( * ) Notice: Subject to any disclaimer, the term of this patent is extended or adjusted under 35 U.S.C. 154(b) by 301 days.

(21) Appl. No.: 17/890,053

(22) Filed: Aug. 17, 2022

(65) Prior Publication Data

US 2022/0399965 A1   Dec. 15, 2022

Related U.S. Application Data

(63) Continuation of application No. PCT/CN2020/076285, filed on Feb. 21, 2020.

(51) Int. Cl.
*H04L 1/00* (2006.01)
*H04L 1/1867* (2023.01)
*H04W 4/06* (2009.01)
*H04L 12/18* (2006.01)

(52) U.S. Cl.
CPC ............. *H04L 1/1887* (2013.01); *H04W 4/06* (2013.01); *H04L 12/189* (2013.01)

(58) Field of Classification Search
None
See application file for complete search history.

(56) References Cited

U.S. PATENT DOCUMENTS

| | | | |
|---|---|---|---|
| 9,160,779 B2 * | 10/2015 | Cherian | H04L 65/752 |
| 11,533,131 B2 * | 12/2022 | Choi | H04L 5/0053 |
| 2010/0278093 A1 | 11/2010 | Wang et al. | |
| 2018/0270807 A1 | 9/2018 | Salem et al. | |

(Continued)

FOREIGN PATENT DOCUMENTS

| | | |
|---|---|---|
| CN | 103078721 A | 5/2013 |
| CN | 108604958 A | 9/2018 |
| CN | 108768597 A | 11/2018 |

(Continued)

OTHER PUBLICATIONS

Extended European Search Report in European Appln No. 20919780.5, dated Mar. 13, 2023, 9 pages.

(Continued)

*Primary Examiner* — Gerald A Smarth
(74) *Attorney, Agent, or Firm* — Fish & Richardson P.C.

(57) ABSTRACT

This application provides a data transmission method and an apparatus, and relates to the field of communication technologies. One example data transmission method includes: receiving scheduling information from a first communication apparatus; determining transmission indication information based on the scheduling information; receiving, based on the scheduling information, a first transport block from the first communication apparatus, and determining first hybrid automatic repeat request (HARQ) information of the first transport block; and determining a first HARQ process based on the first HARQ information and the transmission indication information, and allocating the first transport block to the first HARQ process.

12 Claims, 8 Drawing Sheets

(56) References Cited

U.S. PATENT DOCUMENTS

2020/0008097 A1* 1/2020 Fujishiro ............... H04W 72/30

FOREIGN PATENT DOCUMENTS

| EP | 2026491 A1 | 2/2009 | |
|----|----|----|----|
| EP | 3282725 A1 * | 2/2018 | ............ H01Q 1/085 |
| WO | WO-2016163548 A1 * | 10/2016 | ............ H01Q 1/085 |

OTHER PUBLICATIONS

3GPP TR 38.821 V16.0.0 (Dec. 2019), "3rd Generation Partnership Project; Technical Specification Group Radio Access Network; Solutions for NR to Support Non-Terrestrial Networks (NTN)(Release 16)," Dec. 2019, 140 pages.

PCT International Search Report and Written Opinion issued in International Application No. PCT/CN2020/076285 on Nov. 24, 2020, 15 pages (with English translation).

* cited by examiner

DATA TRANSMISSION METHOD AND APPARATUS FOR A HARQ OPERATION

CROSS-REFERENCE TO RELATED APPLICATIONS

This application is a continuation of International Application No. PCT/CN2020/076285, filed on Feb. 21, 2020, the disclosure of which is hereby incorporated by reference in its entirety.

TECHNICAL FIELD

This application relates to the field of communication technologies, and in particular, to a data transmission method and an apparatus.

BACKGROUND

A multimedia broadcast multicast service (multimedia broadcast multicast service, MBMS) is a service oriented to a plurality of user equipments (user equipments, UEs), for example, live transmission, public safety or software updates in batches. A multicast transmission technology is a technology in which a transport block is simultaneously sent by the MBMS service to the plurality of user equipments via a base station. Between a network and the UE, the MBMS may be sent to the UE in a unicast mode by establishing a bearer dedicated to the UE, or may be sent to the UE in a multicast transmission mode by establishing a bearer dedicated to the MBMS. When a plurality of UEs need to receive an MBMS service, if the MBMS is sent in a unicast transmission mode, bearers dedicated to a large quantity of UEs need to be established, and a large quantity of resources are consumed; or if the MBMS is sent to the UEs in a multicast mode, only a bearer dedicated to the MBMS needs to be established, and all UEs interested in the service may receive the MBMS. When the plurality of UEs are interested in a same service, the base station receives the service from a core network, and then sends the service to the plurality of UEs in the multicast mode. To ensure reliability of a data packet in unicast transmission, a hybrid automatic repeat request (hybrid automatic repeat request, HARQ) is designed specific to the unicast transmission.

Because in current multicast (groupcast) service transmission, a HARQ technology is not used, a current HARQ technology is only specific to the unicast transmission. After a reliability requirement is subsequently put forward for the multicast service transmission, an existing HARQ technology cannot be directly applied to multicast transmission, so that a proper HARQ mechanism needs to be redesigned to ensure a normal HARQ in both the unicast transmission and the multicast transmission.

SUMMARY

This application provides a data transmission method and an apparatus. A proper HARQ mechanism is designed to ensure a normal HARQ in unicast transmission or multicast transmission.

To achieve the foregoing objectives, this application uses the following technical solutions.

According to a first aspect, a data transmission method is provided. The method may be performed by a second communication apparatus, and the second communication apparatus may alternatively be a module or a chip in the second communication apparatus, or the second communication apparatus may be a chip or a system on chip. The method includes: First, scheduling information is received from a first communication apparatus, and transmission indication information is determined based on the scheduling information. For example, the scheduling information includes downlink assignment (downlink assignment), downlink control information (downlink control information, DCI), or the like, and indicates a time-frequency location at which a terminal device receives a transport block. In addition, the transmission indication information may specifically indicate a transmission mode of a first transport block. For example, when the transmission indication information includes indication information of a multicast transmission mode, the first transport block uses the multicast transmission mode; or when the transmission indication information includes indication information of a unicast transmission mode, the first transport block uses the unicast transmission mode. In addition, the transmission indication information may alternatively be determined by using a scrambling manner of the scheduling information. For example, when the scheduling information is scrambled by using a cell radio network temporary identifier (cell-radio network temporary identity, C-RNTI), the transmission indication information indicates that the transmission mode of the first transport block is the unicast transmission mode. When the scheduling information is scrambled by using a group radio network temporary identifier (group-RNTI, G-RNTI), the transmission indication information indicates that the transmission mode of the first transport block is the multicast transmission mode. Certainly, when the G-RNTI is used for scrambling, different G-RNTIs may be used for scrambling. The different G-RNTIs correspond to first transport blocks of different multicast services. Therefore, in addition to indicating transmission modes of the first transport blocks, the transmission indication information may further indicate transmission specific to different services in a same transmission mode (for example, all are multicast transmission). For example, that the different G-RNTIs are used for scrambling represents that transmission is specific to different services. Then, a first transport block is received based on the scheduling information from the first communication apparatus, and first hybrid automatic repeat request HARQ information of the first transport block is determined. In some feasible examples, the first HARQ information may include the following information: a HARQ process identifier (such as a process number), a new data indicator (new data indication, NDI), a redundancy version (redundant version, RV), and a transport block size (transport block size, TBS). Finally, a first HARQ process is determined based on the first HARQ information and the transmission indication information; and the first transport block is allocated to the first HARQ process. In the foregoing solution, the terminal device can receive, based on scheduling information from a network, a first transport block sent by a network device, determine the first HARQ process based on the transmission indication information and the first HARQ information that are determined based on the scheduling information, and allocate the first transport block to the first HARQ process based on the transmission indication information. In this way, for different transport blocks, for example, transport blocks using different transmission modes (multicast or unicast), or transport blocks using a same transmission mode and different RNTI values, the transport blocks may be allocated to the HARQ process based on different transmission indication information, to ensure that a HARQ mechanism is applicable to a scenario in which the transport block is scheduled in the different transmission modes.

In a possible design, a manner of determining the first HARQ process based on the first HARQ information and the transmission indication information is provided, and specifically includes: determining a first soft buffer of the first HARQ process based on the first HARQ information and the transmission indication information; and in this case, that the first transport block is allocated to the first HARQ process specifically includes: allocating the first transport block to the first soft buffer of the first HARQ process. In the foregoing example, the first HARQ information and the transmission indication information correspond to the first HARQ process. Further, in some implementations, the first HARQ information may be allocated to the first HARQ process or the first soft buffer of the first HARQ process. In some other implementations, the transmission indication information may be allocated to the first HARQ process or the first soft buffer of the first HARQ process. A reason for allocating the transmission indication information and the first HARQ information to the first HARQ process or the first soft buffer is as follows: The first HARQ information may include the HARQ process number, the NDI, the RV, the TBS, and the like that correspond to the transport block, and the transmission indication information may include a transmission mode of the transport block. Therefore, in a subsequent HARQ process, for example, combination, decoding, new transmission, or retransmission, when the foregoing information of the transport block needs to be used again, information carried in the transmission indication information and the first HARQ information may be directly read from the first soft buffer.

In a possible design, a manner of determining whether the first transport block is newly transmitted or retransmitted is provided. The first HARQ information includes the NDI, and after the allocating the first transport block to the first soft buffer of the first HARQ process, the method further includes: if it is determined that the NDI is not toggled, decoding data obtained by combining data of the first transport block and data of the first soft buffer; or if it is determined that the NDI is toggled, decoding data of the first transport block. In addition, when it is determined that the data of the first transport block is successfully decoded, or it is determined that the data obtained by combining the data of the first transport block and the data of the first soft buffer is successfully decoded, an acknowledgement ACK is sent to the first communication apparatus. When it is determined that the data of the first transport block fails to be decoded, or it is determined that the data obtained by combining the data of the first transport block and the data of the first soft buffer fails to be decoded, the data of the first soft buffer is replaced with the data of the first transport block or the data obtained by combining the data of the first transport block and the data of the first soft buffer, and a negative acknowledgement NACK is sent to the first communication apparatus.

According to a second aspect, a data transmission method is provided. The method may be performed by a first communication apparatus, and the second communication apparatus may alternatively be a module or a chip in the first communication apparatus, or the first communication apparatus may be a chip or a system on chip. The method includes: sending scheduling information to the second communication apparatus, where the scheduling information is used by the second communication apparatus to determine transmission indication information. For example, the scheduling information may include downlink assignment information and DCI. In addition, the transmission indication information may specifically indicate a transmission mode of a first transport block. For example, when the transmission indication information includes indication information of a multicast transmission mode, the first transport block uses the multicast transmission mode; or when the transmission indication information includes indication information of a unicast transmission mode, the first transport block uses the unicast transmission mode. The transmission indication information may alternatively indicate the transmission mode of the first transport block by using a scrambling manner of the scheduling information. For example, when the scrambling manner indicated by the transmission indication information is a C-RNTI, the transmission mode of the first transport block is the unicast transmission mode. When the scrambling manner indicated by the transmission indication information is a G-RNTI, the transmission mode of the first transport block is the multicast transmission mode. Certainly, when the G-RNTI is used for scrambling, different G-RNTIs may be used for scrambling. The different G-RNTIs correspond to first transport blocks of different multicast services. Therefore, in addition to indicating transmission modes of the first transport blocks, the transmission indication information may further indicate transmission specific to different services in a same transmission mode (for example, all are multicast transmission). For example, that the different G-RNTIs are used for scrambling represents that transmission is specific to different services. The second communication apparatus receives, based on the scheduling information, a first transport block from the first communication apparatus, determines first hybrid automatic repeat request HARQ information of the first transport block, determines a first HARQ process based on the first HARQ information and the transmission indication information, and allocates the first transport block to the first HARQ process based on the transmission indication information. For technical effects implemented in the second aspect, refer to the first aspect. Details are not described herein again.

In a possible design, the method further includes: receiving an ACK sent by the second communication apparatus; or receiving a NACK sent by the second communication apparatus.

In a possible design, the method further includes: determining configuration information based on capability information of the second communication apparatus, where the configuration information includes the first HARQ information, and the capability information includes that a HARQ process corresponding to the first HARQ information corresponds to at least one soft buffer. The first communication apparatus receives the capability information from the second communication apparatus, or the first communication apparatus determines the capability information according to a protocol.

According to a third aspect, a data transmission method is provided. The method may be performed by a second communication apparatus, and the second communication apparatus may alternatively be a module or a chip in the second communication apparatus, or the second communication apparatus may be a chip or a system on chip. The method includes: first receiving scheduling information from a first communication apparatus; then receiving, based on the scheduling information, a first transport block from the first communication apparatus, and determining first hybrid automatic repeat request HARQ information of the first transport block; and finally determining a second HARQ process based on the first HARQ information and a first association relationship, and allocating the first transport block to the second HARQ process, where the first association relationship includes a correspondence between a first HARQ process corresponding to the first HARQ information and a second HARQ process. In the foregoing solution, the second communication apparatus can receive, based on the scheduling information from the first communication apparatus, the first transport block sent by the first communication apparatus, determine the second HARQ process based on the first HARQ information determined based on the scheduling information and the first association relationship that includes the correspondence between a first HARQ process corresponding to the first HARQ information and a second HARQ process, and allocate the first transport block to the second HARQ process. In this way, for a retransmitted transport block, a second HARQ process different from that used during new transmission may be used, to ensure that a HARQ mechanism adapts to different transmission modes of the transport block.

In a possible design, a manner of determining the second HARQ process based on the first HARQ information and the first association relationship is provided, and includes: determining a second soft buffer of the second HARQ process based on the first HARQ information and the first association relationship; and the allocating the first transport block to the second HARQ process includes: allocating the first transport block to the second soft buffer of the second HARQ process.

In a possible design, the second HARQ process may be directly determined based on the first HARQ information and the first association relationship, or the second HARQ process may be indirectly determined. The following manner of indirectly determining the second HARQ process is: the determining a second HARQ process based on the first HARQ information and a first association relationship includes: determining the first HARQ process based on the first HARQ information; and determining the second HARQ process based on the first HARQ process and the first association relationship.

In a possible design, a manner of determining whether the first transport block is newly transmitted or retransmitted is provided. The first HARQ information includes an NDI, and the allocating the first transport block to the second soft buffer of the second HARQ process further includes: if it is determined that the NDI is not toggled, decoding data obtained by combining data of the first HARQ process and data of the second soft buffer of the second HARQ process; or if it is determined that the NDI is toggled, decoding data of the first transport block.

In a possible design, after the receiving scheduling information from a first communication apparatus, the method further includes: determining transmission indication information based on the scheduling information, where the transmission indication information includes indication information of a multicast transmission mode or indication information of a unicast transmission mode. The transmission indication information includes a scrambling manner of first scheduling information, where the scrambling manner includes a C-RNTI or a G-RNTI, and when the scrambling manner is the C-RNTI, a transmission mode of the first transport block is the unicast transmission mode; or when the scrambling manner is the G-RNTI, a transmission mode of the first transport block is the multicast transmission mode.

In a possible design, a manner of obtaining the first association relationship is further provided: obtaining the first association relationship from a predetermined protocol; or determining the first association relationship based on RRC signaling from the first communication apparatus; or determining the first association relationship based on DCI from the first communication apparatus; or determining the first association relationship based on a media access control control element (media access control control element, MAC CE) from the first communication apparatus.

In a possible design, to determine that the first transport block is retransmitted for data corresponding to the first HARQ process associated with the second HARQ process, the method further includes: obtaining first indication information, where the first indication information indicates that the first transport block is retransmitted for the data corresponding to the second HARQ process. A manner of obtaining the first indication information includes: determining the first indication information based on the DCI from the first communication apparatus; or determining the first indication information based on the scrambling manner of the first transport block. When the DCI is used to determine the first indication information, a new field may be carried in the DCI; or DCI in a special format may be used, for example, may be different from common DCI, and may be specifically newly added DCI; or a redundancy version (redundant version, RV) in the DCI is used.

According to a fourth aspect, a data transmission method is provided. The method may be performed by a first communication apparatus, and the second communication apparatus may alternatively be a module or a chip in the first communication apparatus, or the first communication apparatus may be a chip or a system on chip. The method includes: sending scheduling information to the second communication apparatus; and sending, based on the scheduling information, a first transport block to the second communication apparatus, where the second communication apparatus receives the first transport block from the first communication apparatus based on the scheduling information, determines first hybrid automatic repeat request HARQ information of the first transport block, determines a second HARQ process based on the first HARQ information and a first association relationship, and allocates the first transport block to the second HARQ process, where the first association relationship includes a correspondence between a first HARQ process corresponding to the first HARQ information and a second HARQ process. For technical effects implemented in the fourth aspect, refer to the third aspect. Details are not described herein again.

In a possible design, RRC signaling that carries the first association relationship is sent to the second communication apparatus; or DCI that carries the first association relationship is sent to the second communication apparatus.

In a possible design, DCI that carries first indication information is sent to the second communication apparatus, where the first indication information indicates that the first transport block is retransmitted for data corresponding to the second HARQ process.

In a possible design, the method further includes: determining configuration information based on capability information of the second communication apparatus, where the configuration information includes the first HARQ information, and the capability information includes that a HARQ process corresponding to the first HARQ information corresponds to at least one soft buffer. The first communication apparatus receives the capability information from the second communication apparatus, or the first communication apparatus determines the capability information according to a protocol.

According to a fifth aspect, a data transmission method is provided. The method may be performed by a second communication apparatus, and the second communication apparatus may alternatively be a module or a chip in the second communication apparatus, or the second communication apparatus may be a chip or a system on chip. The method includes: Scheduling information is received from a first communication apparatus. For example, the scheduling information includes downlink assignment information and downlink control information (downlink control information, DCI). Then, a first transport block is received based on the scheduling information from the first communication apparatus; and first hybrid automatic repeat request HARQ information of the first transport block is determined. Finally, a first HARQ process is determined based on the first HARQ information; and the first transport block is allocated to the first HARQ process. In the foregoing solution, the second communication apparatus can receive, based on the scheduling information from the first communication apparatus, the first transport block sent by the first communication apparatus, determine the first HARQ process based on the first HARQ information determined based on the scheduling information, and allocate the first transport block to the first HARQ process based on transmission indication information. In this way, for different transport blocks, for example, different transmission modes (multicast or unicast) may be used, or the transport blocks may be allocated to the HARQ process based on different first HARQ information (which, for example, may be a HARQ process number). For example, the transport blocks using the different transmission modes correspond to different HARQ processes, to ensure that a HARQ mechanism adapts to the different transmission modes of the transport block.

In a possible design, to determine that the first transport block is retransmitted for data corresponding to another HARQ process, the method further includes: obtaining second indication information, where the second indication information indicates that the first transport block is retransmitted for the data corresponding to a second HARQ process. A manner of obtaining the indication information includes: determining the indication information based on DCI from the first communication apparatus; or determining the indication information based on a header of the first transport block. When the DCI is used to determine the indication information, a new field may be carried in the DCI; or DCI in a special format may be used, for example, may be DCI different from common DCI, and may be specifically newly added DCI; or a redundancy version (redundant version, RV) in the DCI is used.

In a possible design, a manner of determining the first HARQ process based on the first HARQ information is provided, and specifically includes: determining a first soft buffer of the first HARQ process based on the first HARQ information; and in this case, that the first transport block is allocated to the first HARQ process specifically includes: allocating the first transport block to the first soft buffer of the first HARQ process.

In a possible design, a manner of determining whether the first transport block is newly transmitted or retransmitted is provided. The first HARQ information includes an NDI, and after that the first transport block is allocated to the first soft buffer of the first HARQ process, the method further includes: if it is determined that the NDI is not toggled, decoding data of the first transport block; or if it is determined that the NDI is toggled, decoding data of the first transport block. In addition, when it is determined that the data of the first transport block is successfully decoded, an acknowledgement ACK is sent to the first communication apparatus; or when it is determined that the data of the first transport block fails to be decoded, a negative acknowledgement NACK is sent to the first communication apparatus.

According to a sixth aspect, a data transmission method is provided. The method may be performed by a first communication apparatus, and the second communication apparatus may alternatively be a module or a chip in the first communication apparatus, or the first communication apparatus may be a chip or a system on chip. The method includes: sending scheduling information to the second communication apparatus; sending, based on the scheduling information, a first transport block to the second communication apparatus, where the second communication apparatus receives, based on the scheduling information, the first transport block from the first communication apparatus, and determines first hybrid automatic repeat request HARQ information of the first transport block; and determining a first HARQ process based on the first HARQ information, and allocating the first transport block to the first HARQ process. For technical effects implemented in the sixth aspect, refer to the fifth aspect. Details are not described herein again.

In a possible design, DCI that carries second indication information is sent to the second communication apparatus, where the second indication information indicates that the first transport block is retransmitted for data corresponding to a second HARQ process.

In a possible design, the method further includes: receiving an ACK sent by the second communication apparatus; or receiving a NACK sent by the second communication apparatus.

In a possible design, the method further includes: determining configuration information based on capability information of the second communication apparatus, where the configuration information includes the first HARQ information, and the capability information includes that a HARQ process corresponding to the first HARQ information corresponds to at least one soft buffer. The first communication apparatus receives the capability information from the second communication apparatus, or the first communication apparatus determines the capability information according to a protocol.

According to a seventh aspect, a communication apparatus is provided, to implement the foregoing methods. The communication apparatus may be the first communication apparatus or the second communication apparatus in the first aspect to the sixth aspect. The first communication apparatus or the second communication apparatus includes a corresponding module, unit, or means (means) for implementing the foregoing method. The module, unit, or means may be implemented by hardware, or may be implemented by software, or may be implemented by hardware executing corresponding software. The hardware or the software includes one or more modules or units corresponding to the foregoing functions.

According to an eighth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the first communication apparatus or the second communication apparatus in the first aspect to the sixth aspect.

According to a ninth aspect, a communication apparatus is provided. The communication apparatus includes a processor. The processor is configured to: be coupled to a memory, and after reading instructions in the memory, perform the method according to any one of the foregoing aspects according to the instructions. The communication apparatus may be the first communication apparatus or the second communication apparatus in the first aspect to the sixth aspect.

According to a tenth aspect, a computer-readable storage medium is provided. The computer-readable storage medium stores a computer program. When the computer program is run on a computer, the computer is enabled to perform the method according to any one of the foregoing aspects.

According to an eleventh aspect, a computer program product including instructions is provided. When the computer program product runs on a computer, the computer is enabled to perform the method according to any one of the foregoing aspects.

According to a twelfth aspect, a communication apparatus (where for example, the communication apparatus may be a chip or a chip system) is provided. The communication apparatus includes a processor and an interface, configured to implement a function in any one of the foregoing aspects. In a possible design, the communication apparatus further includes the memory, and the memory is configured to store necessary program instructions and data. When the communication apparatus is a chip system, the communication apparatus may include a chip, or may include a chip and another discrete component.

For technical effects brought by any one of design manners in the seventh aspect to the twelfth aspect, refer to technical effects brought by different design manners of the first aspect, the second aspect, the third aspect, or the fourth aspect. Details are not described herein again.

According to a thirteenth aspect, a communication system is provided. The communication system includes the first communication apparatus according to the foregoing aspects and the second communication apparatus according to the foregoing aspects. In an example, the first communication apparatus may be a network device, and the second communication apparatus may be a terminal device.

DESCRIPTION OF EMBODIMENTS

Figure 1:
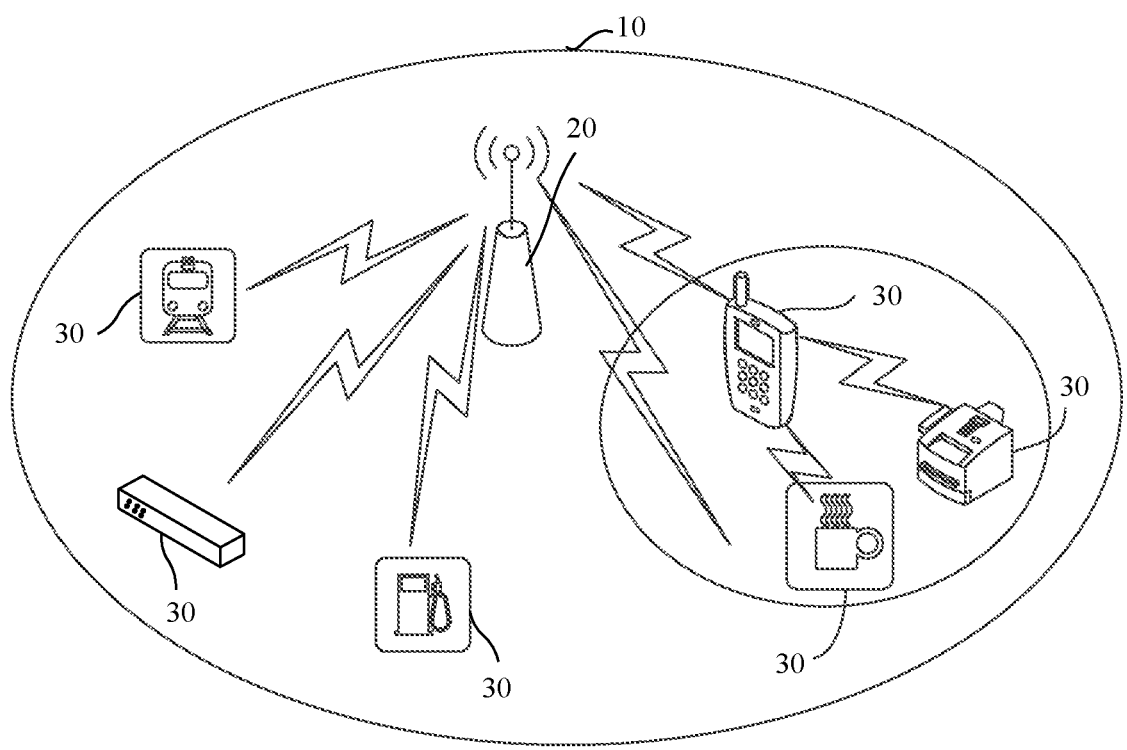
FIG. 1 is a schematic diagram of a structure of a communication system according to an embodiment of this application.

For ease of understanding technical solutions in embodiments of this application, the following first briefly describes technologies or terms related to this application.

(1) A network device is a device that can provide a random access function for a terminal device or a chip that can be disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home NodeB (for example, home evolved NodeB or home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission and reception point, TRP, or transmission point, TP), or the like, may be a gNB or a transmission point (TRP or TP) in a 5G system such as an NR system or one antenna panel or one group of antenna panels (including a plurality of antenna panels) of a base station in a 5G system, or may be a network node forming a gNB or a transmission point, for example, a baseband unit (BBU) or a distributed unit (distributed unit, DU). Alternatively, the network device may be a base station in a future evolved public land mobile network (public land mobile network, PLMN), a broadband network gateway (broadband network gateway, BNG), an aggregation switch, a non-3rd generation partnership project (3rd generation partnership project, 3GPP) access device, or the like. This is not specifically limited in embodiments of this application. Optionally, a base station in embodiments of this application may include base stations in various forms, for example, a macro base station, a micro base station (which is also referred to as a small cell), a relay station, and an access point. This is not specifically limited in embodiments of this application.

(2) A terminal device may be a device configured to implement a wireless communication function, for example, a terminal or a chip that can be used in the terminal. The terminal device may be user equipment (user equipment, UE), a mobile station (mobile station, MS), a mobile terminal (mobile terminal, MT), or the like, and is a device that provides voice and/or data connectivity for a user. For example, the terminal device includes a handheld device, a vehicle-mounted device, and the like that have a wireless connection function. Currently, the terminal device may be a mobile phone (mobile phone), a tablet, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

(3) A multicast transmission technology, which may also be referred to as a multimedia broadcast multicast service (multimedia broadcast multicast service, MBMS) technology or a multicast transmission mode, is a technology in which data of a specific service is simultaneously sent to a plurality of terminal devices through a network device. When the multicast technology is used for transmission, a plurality of terminal devices simultaneously attempt to receive same data in a process in which a network device (for example, a base station) sends the same data. Currently, multicast transmission technologies are mainly classified into two types: a multimedia broadcast multicast service single frequency network (multimedia broadcast multicast service single frequency network, MBSFN) service and a single cell point to multipoint (single cell point to multipoint, SC-PTM) service. The MBSFN mode means that a plurality of mutually synchronized cells (for example, a plurality of base stations) in an MBSFN area simultaneously transmit same information to a plurality of terminal devices, and the terminal devices receive single data obtained through superposition. In this way, strength of a received signal can be improved, and inter-cell interference can be eliminated. The SC-PTM mode means that an MBMS service is transmitted via only one cell (for example, one base station), and one network device simultaneously performs group scheduling on a plurality of terminal devices. Sending in a multicast (multicast) mode means: When an apparatus sends a transport block (transport block, TB) corresponding to a protocol data unit (protocol data unit, PDU), a group radio network temporary identifier (group radio network temporary identifier, G-RNTI) is used to scramble the PDU, or scramble downlink control information (downlink control information, DCI) corresponding to the PDU, and at the same time, one or more apparatuses receive the same PDU based on a same G-RNTI. Alternatively, transmitting the PDU in the multicast mode may mean that a location of the same PDU is notified to a plurality of apparatuses in a semi-static manner, and the plurality of apparatuses may receive the PDU at the same time. Alternatively, transmitting the PDU in the multicast mode may mean that the PDU is transmitted over a radio bearer established for multicast transmission or transmitted on a channel specially designed for multicast. Receiving in the multicast transmission mode means: When sending is performed in the multicast transmission mode, one of a plurality of receiving apparatuses receives the PDU based on the G-RNTI; or one of a plurality of receiving apparatuses receives the PDU by using a radio bearer established for multicast transmission or receives the PDU on a channel used for multicast transmission. In this application, groupcast is a specific mode of multicast. Therefore, multicast may also be referred to as groupcast. Sending in a unicast (unicast) mode means: When an apparatus sends a TB corresponding to a PDU, a cell radio network temporary identifier (cell network temporary identifier, C-RNTI) is used to scramble the PDU, or scramble DCI corresponding to the PDU, and at the same time, only one apparatus receives the same PDU based on the C-RNTI. Alternatively, transmitting the PDU in the unicast transmission mode may mean that the PDU is transmitted over a radio bearer established for unicast transmission or transmitted on a channel specially designed for unicast. Receiving in the unicast transmission mode means: When sending is performed in the unicast transmission mode, one receiving apparatus receives the PDU based on the C-RNTI, or one apparatus receives the PDU over the radio bearer established for unicast transmission or on the channel used for unicast transmission.

A network device and a terminal device that communicate with each other have specific protocol layer structures. For example, a control plane protocol layer structure may include functions of protocol layers such as an RRC layer, a PDCP layer, an RLC layer, a MAC layer, and a physical layer. A user plane protocol layer structure may include functions of protocol layers such as the PDCP layer, the RLC layer, the MAC layer, and the physical layer. The physical layer is located at the lowest layer (layer 1), the MAC layer, the RLC layer, and the PDCP layer belong to a second layer (layer 2), and the RRC layer belongs to a third layer (layer 3). In an implementation, a service data adaptation protocol (service data adaptation protocol, SDAP) layer may be further included above the PDCP layer. Functions of these protocol layers may be implemented by one node, or may be implemented by a plurality of nodes. For example, in an evolved structure, a radio access network device may include a centralized unit (centralized unit, CU) and a distributed unit (distributed unit, DU). A plurality of DUs may be centrally controlled by one CU. The CU and the DU may be obtained through division based on a protocol layer of a wireless network. For example, functions of the PDCP layer and a layer above the PDCP layer are set on the CU, and functions of protocol layers below the PDCP layer, such as the RLC layer and the MAC layer, are set on the DU. It should be understood that division based on the protocol layer is merely an example, and division may alternatively be performed based on another protocol layer. For example, division is performed based on the RLC layer. In this case, functions of the RLC layer and a layer above the RLC layer are set on the CU, and a function of a protocol layer below the RLC layer is set on the DU. Alternatively, division is performed at a protocol layer. For example, a part of functions of the RLC layer and a function of a protocol layer above the RLC layer are set on the CU, and the remaining function of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU. Uplink data transmission is used as an example when the network device and the terminal device perform data transmission. Data first arrives at a PDCP layer of the terminal device. After being processed at the PDCP layer, the data is transmitted to the RLC layer and the MAC layer. After being processed at the MAC layer, the data is sent to the network device via the physical layer. When the network device receives the data, protocol layers that the data sequentially passes through are the physical layer, the MAC layer, the RLC layer, and the PDCP layer. Data on each radio bearer needs to be processed at each layer. Each layer has a corresponding functional entity to perform a corresponding function. For example, the PDCP layer corresponds to a PDCP entity, the RLC layer corresponds to an RLC entity, and the MAC layer corresponds to a MAC entity. Each radio bearer includes one PDCP entity and one or more RLC entities, and each RLC entity corresponds to one logical channel. One MAC entity corresponds to a plurality of logical channels. Data on the logical channels may be multiplexed at the MAC layer, for example, multiplexed into a same transport block at the MAC layer, and finally sent via the physical layer. A downlink data transmission process is also similar. During multicast transmission, one PDCP is configured to be associated with a plurality of RLC entities, and the plurality of RLC entities include an RLC entity corresponding to the unicast transmission mode and an RLC entity corresponding to the multicast transmission mode. During data transmission, data is transmitted through the RLC entity corresponding to the unicast transmission mode and/or the RLC entity corresponding to the multicast transmission mode. In descriptions of embodiments of this application, the "RLC entity" and the "logical channel" may be considered as equivalent concepts, and may be replaced with each other. For example, descriptions thereof may be: One PDCP entity is associated with a plurality of logical channels, and the plurality of logical channels include a logical channel corresponding to the unicast transmission mode and a logical channel corresponding to the multicast transmission mode.

(4) A HARQ (hybrid automatic repeat request, hybrid automatic repeat request) is a technology combining a forward error correction (forward error correction, FEC) method and an automatic repeat request (automatic repeat request, ARQ) method. The FEC enables a receive end to correct some errors by adding redundant information, and this reduces a quantity of times of retransmission. For an error that cannot be corrected by the FEC, the receive end requests, by using an ARQ mechanism, a transmit end to resend a transport block (transport block, TB). The receive end uses an error-detection code, namely, a cyclic redundancy check (cyclic redundancy check, CRC), to detect whether an error occurs in the received TB. If no error is detected by the receive end, the receive end sends an ACK to the transmit end; and after receiving the ACK, the transmit end sends a next TB. Alternatively, if the receive end detects an error, the receive end sends a negative acknowledgement NACK to the transmit end; and after receiving the NACK, the transmit end resends the previous TB to the receive end. Although some TBs cannot be correctly decoded, they still contain useful information. Therefore, by using HARQ with soft combination (HARQ with soft combining), a received erroneous data packet is stored in a HARQ buffer, and is combined with a subsequently received retransmitted data packet, to obtain a data packet that is more reliable than a data packet obtained by separate decoding. Then, the combined data packet is decoded. If decoding still fails, a process of "requesting retransmission, and then performing soft combination" is repeated. Each piece of sent data occupies one HARQ process number when HARQ is performed. In this way, there may be a plurality of parallel HARQ processes at the same time, and each process has its own process number. When one HARQ process is waiting for acknowledgement information, the transmit end may continue to send new data by using another HARQ process. An HARQ entity exists at both the transmit end and the receive end. HARQ operations of the transmit end include sending and retransmission of the TB, receiving and processing of an ACK or a NACK, and the like. HARQ operations of the receive end include receiving the TB, emptying a HARQ buffer, performing data combination, generating and sending an ACK or a NACK, and the like. In addition, HARQ is classified into uplink HARQ and downlink HARQ. For unicast transmission, the downlink HARQ is specific to a TB carried on a downlink shared channel (downlink shared channel, DL-SCH), and the uplink HARQ is specific to a TB carried on an uplink shared channel (uplink shared channel, DL-SCH). For multicast or broadcast transmission, the downlink HARQ is specific to a TB used for the multicast or broadcast transmission, and the TB is carried on a downlink channel used for multicast or broadcast. Specifically, the uplink HARQ is a processing procedure of acknowledging and retransmitting a TB sent by a terminal device to a network device. The downlink HARQ is a processing procedure of acknowledging and retransmitting a TB sent by a network device to a terminal device. The data scheduling method provided in embodiments of this application mainly relates to the downlink HARQ.

(5) A HARQ buffer may be referred to as a HARQ buffer, buffer space, a buffer, a soft buffer (soft buffer), or the like. The foregoing concepts may be considered as the same. The buffer or the buffer is used by the HARQ entity to store a transport block or data or corresponding instructions. In addition, a corresponding operation may be performed on the transport block or the data in the HARQ buffer according to the instructions. In embodiments of this application, a soft buffer is used as an example for unified description.

The following describes technical solutions in embodiments of this application with reference to the accompanying drawings in embodiments of this application. In the descriptions of this application, unless otherwise specified, "l" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

Embodiments of this application are applicable to 5th generation mobile networks, 5th generation wireless systems, or a 5th-Generation new radio (5G NR) system; or applicable to other wireless communication systems such as a global system for mobile communications (global system for mobile communication, GSM), a universal mobile telecommunications system (universal mobile telecommunications system, UMTS), a code division multiple access (code division multiple access, CDMA) system, a wideband code division multiple access (wideband code division multiple access, WCDMA) system, and a future-oriented new network device system. This is not specifically limited in embodiments of this application. The foregoing communication systems used in this application are merely examples for description, and communication systems used in this application are not limited thereto. A general description is provided herein. Details are not described below again. In addition, the terms "system" and "network" are interchangeable.

FIG. 1 shows a communication system 10 according to an embodiment of this application. The communication system 10 includes one network device 20 and one or more terminal devices 30 connected to the network device 20. Optionally, different terminal devices 30 may communicate with each other.

An example in which the network device 20 shown in FIG. 1 interacts with any terminal device 30 is used. In this embodiment of this application, for downlink scheduling, the network device 20 sends scheduling information and a transport block corresponding to the scheduling information to the terminal device 30, and the scheduling information is used to schedule the transport block TB. The terminal device 30 receives the scheduling information, and receives the transport block TB based on the scheduling information. For uplink scheduling, the network device 20 sends the scheduling information to the terminal device 30, and the terminal device 30 sends the transport block TB to the network device 20 based on the scheduling information.

Certainly, the foregoing mainly uses a terrestrial communication scenario as an example for description. This embodiment of this application is also applicable to a non-terrestrial network (non-terrestrial network, NTN) scenario. For example, a base station is on a satellite (an aircraft) or a base station is on the ground, but a communication signal needs to be forwarded by the satellite or the aircraft.

Optionally, the network device 20 and the terminal device 30 in this embodiment of this application may also be referred to as communication apparatuses, and each may be a general-purpose device or a dedicated device. This is not specifically limited in this embodiment of this application.

Figure 2:
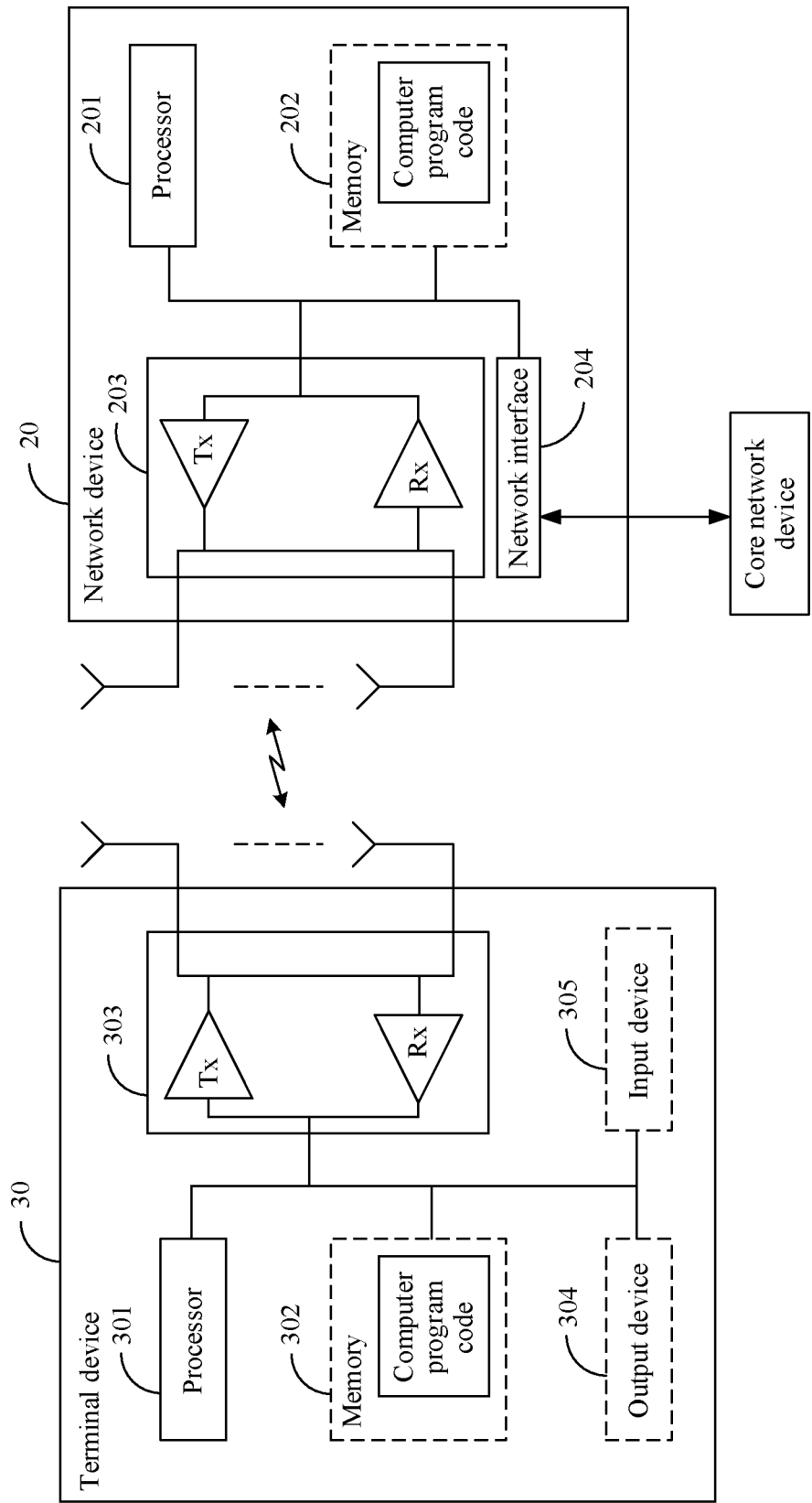
FIG. 2 is a schematic diagram of structures of a terminal device and a network device according to an embodiment of this application.

Optionally, FIG. 2 is a schematic diagram of a structure of a network device 20 and a structure of a terminal device 30 according to an embodiment of this application.

The terminal device 30 includes at least one processor (an example in which the terminal device 30 includes one processor 301 is used for description in FIG. 2) and at least one transceiver (an example in which the terminal device 30 includes one transceiver 303 is used for description in FIG. 2). Optionally, the terminal device 30 may further include at least one memory (an example in which the terminal device 30 includes one memory 302 is used for description in FIG. 2), at least one output device (an example in which the terminal device 30 includes one output device 304 is used for description in FIG. 2), and at least one input device (an example in which the terminal device 30 includes one input device 305 is used for description in FIG. 2).

The processor 301, the memory 302, and the transceiver 303 are connected through a communication line. The communication line may include a path for transmitting information between the foregoing components.

The processor 301 may be a general-purpose central processing unit (central processing unit, CPU), a microprocessor, an application-specific integrated circuit (application-specific integrated circuit, ASIC), or one or more integrated circuits configured to control program execution of the solutions in this application. In specific implementation, in an embodiment, the processor 301 may alternatively include a plurality of CPUs, and the processor 301 may be a single-core (single-CPU) processor or a multi-core (multi-CPU) processor. The processor herein may refer to one or more devices, circuits, or processing cores configured to process data (for example, computer program instructions).

The memory 302 may be an apparatus having a storage function. For example, the memory 302 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory 302 may exist independently, and is connected to the processor 301 through the communication line. The memory 302 may alternatively be integrated with the processor 301.

The memory 302 is configured to store computer-executable instructions for executing the solutions in this application, and the execution is controlled by the processor 301. Specifically, the processor 301 is configured to execute the computer-executable instructions stored in the memory 302, to implement the data scheduling method provided in embodiments of this application.

Alternatively, optionally, in this embodiment of this application, the processor 301 may perform related processing functions in the data scheduling method provided in the following embodiments of this application. The transceiver 303 is responsible for communicating with another device or another communication network. This is not specifically limited in this embodiment of this application.

Optionally, the computer-executable instructions in this embodiment of this application may also be referred to as application program code or computer program code. This is not specifically limited in this embodiment of this application.

The transceiver 303 may use any transceiver-type apparatus, and is configured to communicate with another device or a communication network such as the Ethernet, a radio access network (radio access network, RAN), or a wireless local area network (wireless local area networks, WLAN). The transceiver 303 includes a transmitter (transmitter, Tx) and a receiver (receiver, Rx).

The output device 304 communicates with the processor 301, and may display information in a plurality of manners. For example, the output device 404 may be a liquid crystal display (liquid crystal display, LCD), a light emitting diode (light emitting diode, LED) display device, a cathode ray tube (cathode ray tube, CRT) display device, a projector (projector), or the like.

The input device 305 communicates with the processor 301, and may receive an input of a user in a plurality of manners. For example, the input device 405 may be a mouse, a keyboard, a touchscreen device, or a sensor device.

The network device 20 includes at least one processor (an example in which the network device 20 includes one processor 201 is used for description in FIG. 2), at least one transceiver (an example in which the network device 20 includes one transceiver 203 is used for description in FIG. 2), and at least one network interface (an example in which the network device 20 includes one network interface 204 is used for description in FIG. 2). Optionally, the network device 20 may further include at least one memory (an example in which the network device 20 includes one memory 202 is used for description in FIG. 2). The processor 201, the memory 202, the transceiver 203, and the network interface 204 are connected through the communication line. The network interface 204 is configured to connect to a core network device through a link (for example, an S1 interface), or connect to a network interface of another network device through a wired or wireless link (for example, an X2 interface) (not shown in FIG. 2). This is not specifically limited in this embodiment of this application. In addition, for related descriptions of the processor 201, the memory 202, and the transceiver 203, refer to the descriptions of the processor 301, the memory 302, and the transceiver 303 in the terminal device 30. Details are not described herein again.

Figure 3:
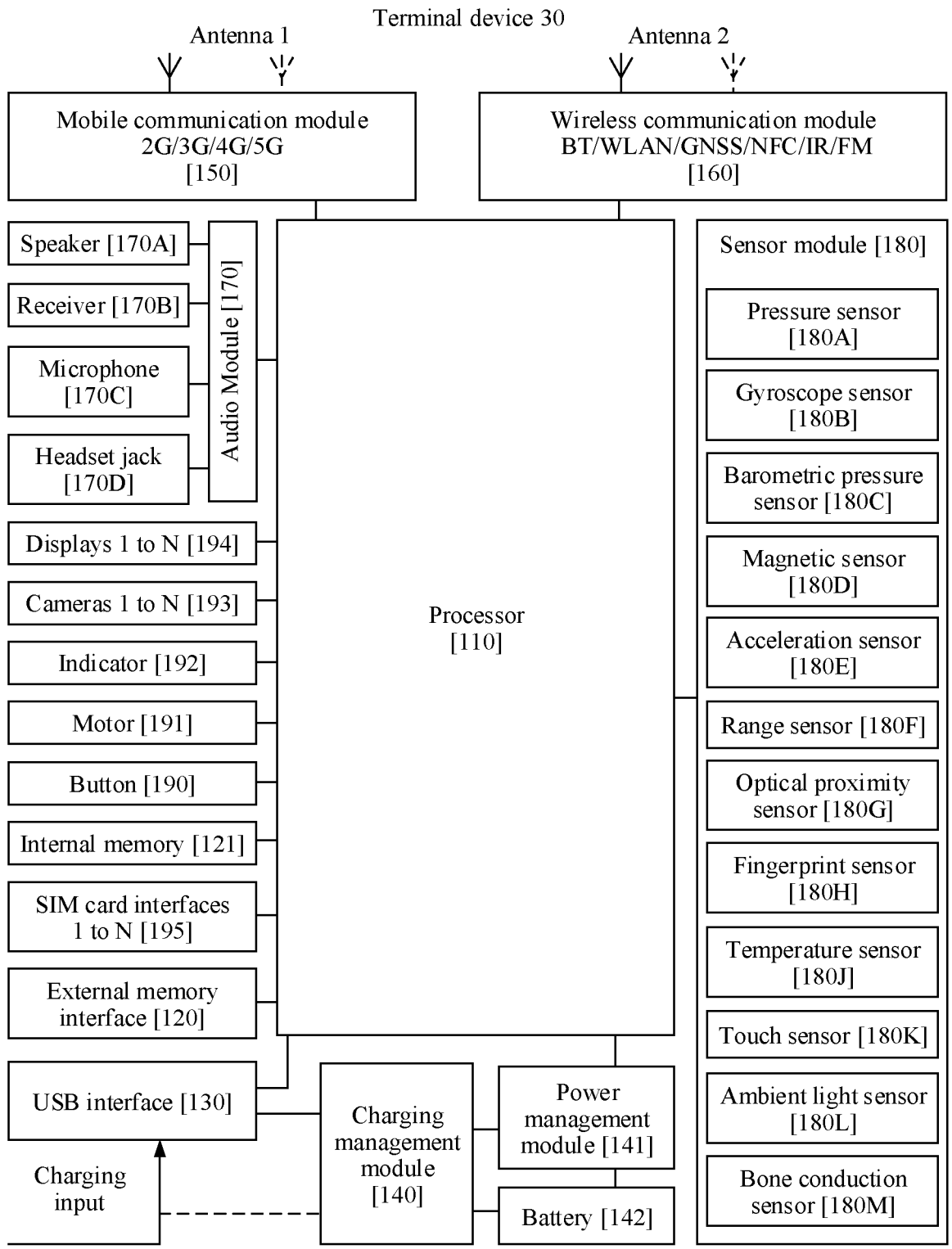
FIG. 3 is a schematic diagram of a structure of a terminal device according to an embodiment of this application.

With reference to the schematic diagram of the structure of the terminal device 30 shown in FIG. 2, for example, FIG. 3 shows a specific structural form of a terminal device 30 according to an embodiment of this application.

In some embodiments, a function of the processor 301 in FIG. 2 may be implemented by using a processor 110 in FIG. 3.

In some embodiments, a function of the transceiver 303 in FIG. 2 may be implemented through an antenna 1, an antenna 2, a mobile communication module 150, a wireless communication module 160, and the like in FIG. 3.

The antenna 1 and the antenna 2 are configured to transmit and receive electromagnetic wave signals. Each antenna in the terminal device 30 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the terminal device 30 and that is used for wireless communication that includes 2G/3G/4G/5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The wireless communication module 160 may provide a solution that is applied to the terminal device 30 and that is used for wireless communication such as a wireless local area network (wireless local area networks, WLAN) (for example, a Wi-Fi network), Bluetooth (bluetooth, BT), a global navigation satellite system (global navigation satellite system, GNSS), frequency modulation (frequency modulation, FM), near field communication (near field communication, NFC) technology, or an infrared (infrared, IR) technology. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. When the terminal device 30 is a first device, that the wireless communication module 160 may provide a solution used for NFC wireless communication on the terminal device 30 means that the first device includes an NFC chip. The NFC chip may improve an NFC wireless communication function. When the terminal device 30 is a second device, that the wireless communication module 160 may provide a solution used for NFC wireless communication on the terminal device 30 means that the first device includes an electronic label (such as a radio frequency identification (radio frequency identification, RFID) label). If an NFC chip of another device is close to the electronic label, the another device may perform NFC wireless communication with the second device.

In some embodiments, the antenna 1 of the terminal device 30 is coupled to the mobile communication module 150, and the antenna 2 of the terminal device 30 is coupled to the wireless communication module 160, so that the terminal device 30 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), or a satellite based augmentation system (satellite based augmentation systems, SBAS).

In some embodiments, a function of the memory 302 in FIG. 2 may be implemented by using an internal memory 121 in FIG. 3, an external memory (for example, a Micro SD card) connected to an external memory interface 120, or the like.

In some embodiments, a function of the output device 304 in FIG. 2 may be implemented by a display 194 in FIG. 3. The display 194 is configured to display an image, a video, and the like. The display 194 includes a display panel.

In some embodiments, a function of the input device 305 in FIG. 2 may be implemented by using a mouse, a keyboard, a touchscreen device, or a sensor module 180 in FIG.

3. For example, as shown in FIG. 3, the sensor module 180 may include one or more of a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, and a bone conduction sensor 180M. This is not specifically limited in this embodiment of this application.

In some embodiments, as shown in FIG. 3, the terminal device 30 may further include one or more of an audio module 170, a camera 193, an indicator 192, a motor 191, a button 190, an SIM card interface 195, a USB interface 130, a charging management module 140, a power management module 141, and a battery 142. The audio module 170 may be connected to a speaker 170A (also referred to as a "loudspeaker"), a telephone receiver 170B (also referred to as a "handset"), a microphone 170C (also referred to as a "mic" or "mike"), an headset jack 170D, or the like. This is not specifically limited in this embodiment of this application.

It may be understood that the structure shown in FIG. 3 does not constitute a specific limitation on the terminal device 30. For example, in some other embodiments of this application, the terminal device 30 may include more or fewer components than those shown in the figure, or some components may be combined, or some components may be split, or the components may be differently arranged. The components shown in FIG. 3 may be implemented by using hardware, software, or a combination of software and hardware.

With reference to FIG. 1 to FIG. 3, the following describes, by using an example in which the network device 20 and any terminal device 30 shown in FIG. 1 interact with each other, a data transmission method provided in embodiments of this application.

It should be noted that names of messages between network elements, names of parameters in the messages, or the like in the following embodiments of this application are merely examples, and there may be other names during specific implementation. This is not specifically limited in embodiments of this application.

Figure 4:
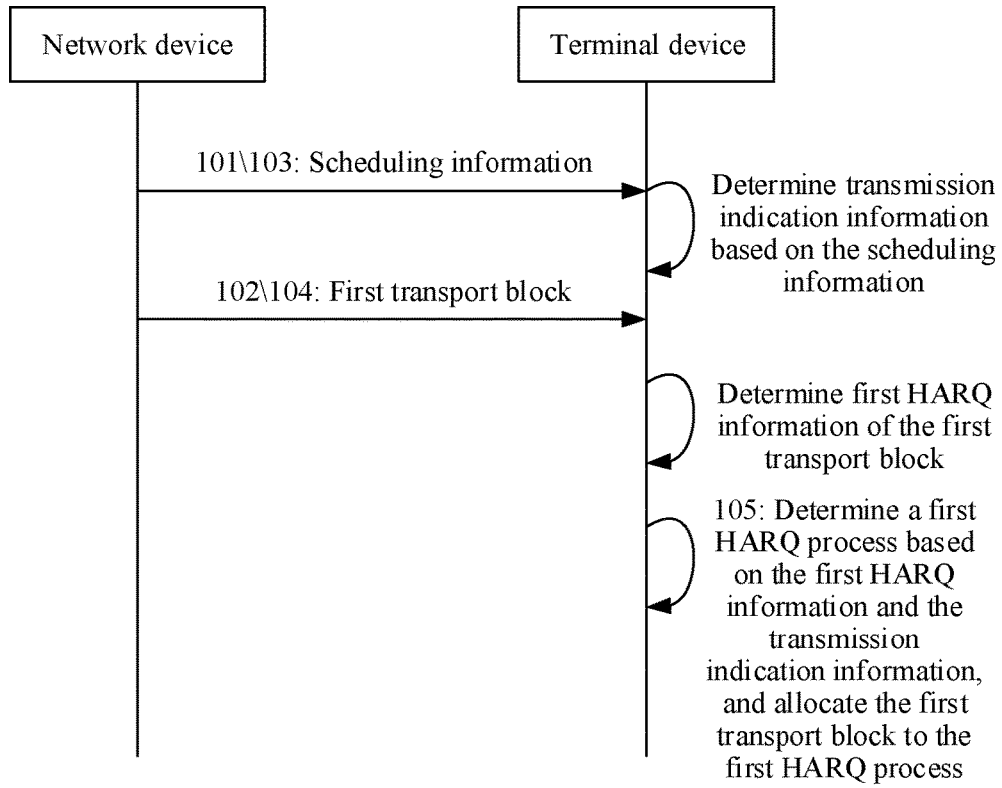
FIG. 4 is a schematic flowchart of a data transmission method according to an embodiment of this application.

FIG. 4 shows a data transmission method according to an embodiment of this application, including the following steps.

101: A network device sends scheduling information to a terminal device.

The scheduling information may include a downlink assignment (downlink assignment), downlink control information (downlink control information, DCI), or the like, and the scheduling information indicates a time-frequency location at which the terminal device receives a transport block.

102: The network device sends a first transport block to the terminal device.

The network device sends the first transport block to the terminal device based on the time-frequency location indicated by the scheduling information.

103: The terminal device receives the scheduling information from the network device, and determines transmission indication information based on the scheduling information.

In step 103, the transmission indication information may specifically indicate a transmission mode of the first transport block. For example, when the transmission indication information indicates that the transmission mode is a multicast transmission mode, it represents that the first transport block is transmitted in the multicast transmission mode; or when the transmission indication information indicates that the transmission mode is a unicast transmission mode, it represents that the first transport block is transmitted in the unicast transmission mode. The transmission indication information may be determined based on a scrambling manner of the scheduling information. For example, when the scheduling information is scrambled by using a C-RNTI, the transmission indication information indicates that the transmission mode of the first transport block is the unicast transmission mode; or when the scheduling information is scrambled by using a G-RNTI, the transmission indication information indicates that the transmission mode of the first transport block is the multicast transmission mode.

In addition, the transmission indication information may be determined based on the scrambling manner of the scheduling information, or may be other indication information included in the scheduling information. For example, other explicit indication information carried in the scheduling information indicates the transmission mode used by the first transport block, or further indicates different services in a same transmission mode.

104: The terminal device receives, based on the scheduling information, the first transport block from the network device, and determines first hybrid automatic repeat request HARQ information of the first transport block.

The first HARQ information may be determined based on the scheduling information. For example, the first HARQ information is included in the scheduling information. In some feasible examples, the first HARQ information may include at least one of the following information: a HARQ process identifier (HARQ process ID), an NDI (new data indication, new data indicator), an RV (Redundant version, redundancy version), and a TBS (transmission block size, transmission block size).

105: The terminal device determines a first HARQ process based on the first HARQ information and the transmission indication information, and allocates the first transport block to the first HARQ process.

Step 105 may specifically include: after determining the first HARQ process based on the first HARQ information and the transmission indication information, further determining a first soft buffer of the first HARQ process; and then allocating the first transport block to the first soft buffer. The allocating the first transport block to the first soft buffer may also be storing the first transport block in the first soft buffer, or storing the data of the first transport block in the first soft buffer.

In the foregoing example, the first HARQ information and the transmission indication information correspond to the first HARQ process. Further, in some implementations, the first HARQ information may be allocated to the first HARQ process or the first soft buffer of the first HARQ process. In some other implementations, the transmission indication information may be allocated to the first HARQ process or the first soft buffer of the first HARQ process. A reason for allocating the transmission indication information and the first HARQ information to the first HARQ process or the first soft buffer is as follows: The first HARQ information may include the HARQ process number, the NDI, the RV, the TBS, and the like that correspond to the transport block, and the transmission indication information may include a transmission mode of the transport block. Therefore, in a subsequent HARQ process, for example, combination, decoding, new transmission, or retransmission, when the foregoing information of the transport block needs to be used again, information carried in the transmission indication information and the first HARQ information may be directly read from the first soft buffer.

In addition, the step 105 may be replaced with the following: The terminal device determines a first HARQ process based on the first HARQ information, and allocates the first transport block to the first HARQ process. Specifically, after determining the first HARQ process based on the first HARQ information, the terminal device further determines the first soft buffer of the first HARQ process, and then allocates the first transport block to the first soft buffer based on the transmission indication information.

Figure 5:
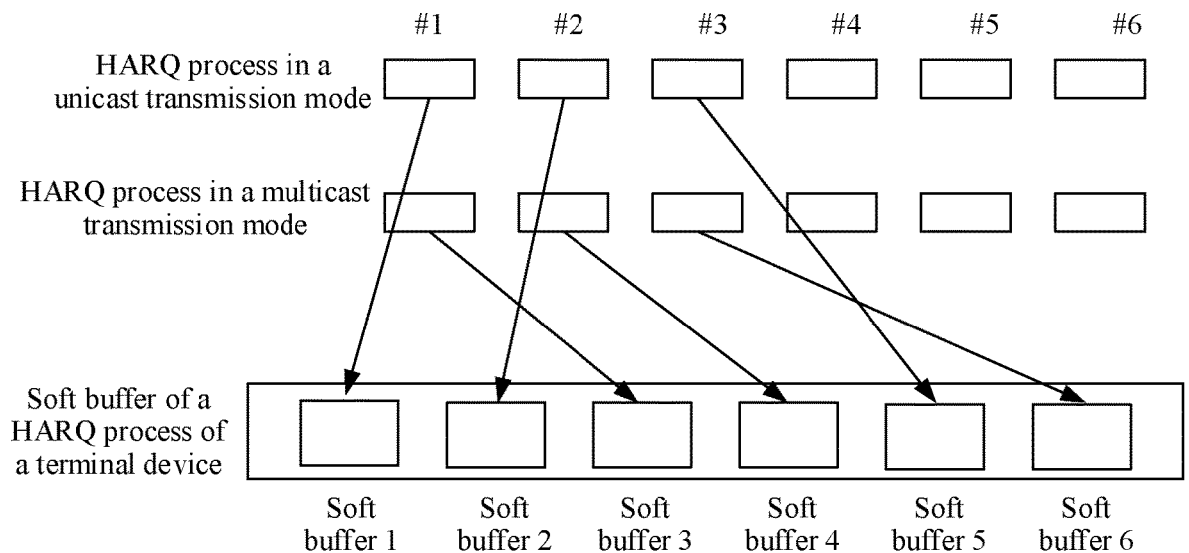
FIG. 5 is a schematic diagram of a manner of using soft buffers according to an embodiment of this application.

It may be understood that when the foregoing solution is used for HARQ, the terminal device usually establishes one HARQ entity for data transmission on each carrier, or may establish one HARQ entity for data transmission of one or more services. Each HARQ entity maintains a specific quantity of HARQ processes, and each HARQ process is associated with one HARQ process identifier, for example, a process number. One HARQ entity is used as an example. The network device configures a maximum quantity N of HARQ processes in the HARQ entity for the terminal device, and correspondingly maintains at least one HARQ buffer in the HARQ entity of the terminal device to store a transport block corresponding to the HARQ process. For example, if N=6, the HARQ entity may maintain six soft buffers (or divide an entire soft buffer into six soft buffers), and each soft buffer is used to store a transport block corresponding to one HARQ process. As shown in FIG. 5, the HARQ process may be a HARQ process corresponding to a multicast transmission mode or a HARQ process corresponding to a unicast transmission mode.

In some implementations, in one HARQ entity, a same HARQ process is allowed to be simultaneously used for a transport block transmitted in the unicast (unicast) transmission mode and a transport block transmitted in the multicast (multicast) transmission mode. This is because transmission in the multicast transmission mode is performed for a plurality of terminal devices, process numbers used for the transmission in the multicast transmission mode are the same for the plurality of terminal devices. Therefore, even if a process number is occupied by unicast transmission of some terminal devices, the process number is allowed to continue to be used in the multicast transmission mode, to avoid difficulty in providing, through coordination, a process number occupied by no terminal device. It is assumed that a same process is used by both the transport block transmitted in the unicast transmission mode and the transport block transmitted in the multicast transmission mode, or a same HARQ process is used by at least two different multicast services, the at least two transport blocks need to be separately stored in the soft buffer of the HARQ process of the terminal device. For example, the process may correspond to at least two soft buffers (or correspond to at least two parts of one soft buffer), so that HARQ operations can be respectively performed in respective soft buffers. It is assumed that the HARQ process numbers in scheduling information of the at least two transport blocks are the same. In this case, the terminal device needs to further determine transmission indication information based on the scheduling information corresponding to the transport blocks, and then place each transport block in a corresponding soft buffer based on the transmission indication information.

The following provides descriptions by using an example in which a scrambling manner of the scheduling information is used as the transmission indication information. Scheduling information of the transport block transmitted in the unicast transmission mode is scrambled by using a C-RNTI, and scheduling information of the transport block transmitted in the multicast transmission mode is scrambled by using a G-RNTI.

For example, scheduling information of transport block 1 corresponding to HARQ process #1 is scrambled by using the C-RNTI and is placed in soft buffer 1; scheduling information of transport block 3 corresponding to HARQ process #2 is scrambled by using the C-RNTI and is placed in soft buffer 2 because the HARQ process is different from the HARQ process corresponding to transport block 1. In addition, scheduling information of transport block 2 corresponding to the HARQ process 1 is scrambled by using the G-RNTI. Because a scrambling manner used for scheduling information of transport block 2 is different from the scrambling manner used for the scheduling information of transport block 1, the scheduling information of transport block 2 is placed in soft buffer 3.

In addition, a manner of determining whether a first transport block is newly transmitted or retransmitted is further provided in this solution. A method for determining retransmission and new transmission is first determining, based on HARQ information and transmission indication information corresponding to the first transport block, a HARQ process or a soft buffer corresponding to the first transport block, and then determining, based on a value of NDI in the scheduling information (for example, DCI) for scheduling the transport block, whether the value of NDI in scheduling information is toggled (that is, the value of NDI is different) in comparison with scheduling information previously scheduled for the same HARQ process or the same soft buffer. If the value of NDI is toggled, new transmission occurs; or if the value of NDI is not toggled, retransmission occurs. In this solution, first HARQ information includes the NDI, and after the allocating the first transport block to the first soft buffer of a first HARQ process, the method further includes: if it is determined that the NDI is not toggled, decoding data obtained by combining data of the first transport block and data of the first soft buffer; or if it is determined that the NDI is toggled, decoding data of the first transport block. It is assumed that the terminal device receives transport block 4 whose scheduling information uses a same scrambling manner and HARQ process number as those of transport block 1, further processing is performed based on a situation. If transport block is a retransmitted transport block, the transport block is placed in soft buffer 1, and data of transport block 4 and data of transport block 1 are combined and decoded. If the decoding succeeds, the data is submitted to a media access control (media access control, MAC) layer for further processing; or if the decoding fails, the data is stored in soft buffer 1. And if this is a newly transmitted data packet, the data of transport block 1 in soft buffer 1 is replaced with the data of transport block 4. The NDI may include one bit whose value is 0 or 1. In two times of scheduling, if the value of NDI is toggled, that is, values of NDI are different in the two times of scheduling, the terminal device may determine, based on this, that the transport block scheduled this time is newly transmitted; otherwise, the transport block scheduled this time is retransmitted.

In addition, when it is determined that data of the first transport block is successfully decoded, or it is determined that the data obtained by combining the data of the first transport block and the data of the first soft buffer is successfully decoded, an acknowledgement ACK is sent to a first communication apparatus. When it is determined that the data of the first transport block fails to be decoded, or that the data obtained by combining the data of the first transport block and the data of the first soft buffer fails to be decoded, the data of the first soft buffer is replaced with the data obtained by combining the data of the first transport block and the data of the first soft buffer, and a negative acknowledgement NACK is sent to the first communication apparatus.

Therefore, based on the foregoing embodiment, retransmission of the transport block sent in the unicast transmission mode may still be performed in the unicast transmission mode, and retransmission of the transport block sent in the multicast transmission mode may still be performed in the multicast transmission mode. For retransmission in the multicast transmission mode, it is assumed that a terminal device has received and successfully decoded a transport block transmitted in the multicast mode, the terminal device discards a retransmitted transport block that is received.

For example, transport block 1 is transmitted to terminal device 1 and terminal device 2 in the multicast transmission mode. If transport block 1 is transmitted by using HARQ process 1 during new transmission, terminal device 1 fails to decode transport block 1, but terminal device 2 successfully decodes transport block 1, terminal device 1 stores data that fails to be decoded in soft buffer 1 corresponding to process 1, and terminal device 2 submits data that successfully decoded to a MAC layer for further processing. After receiving the NACK fed back by terminal device 1, the network device retransmits transport block 1 by using the HARQ process 1. In this case, after receiving retransmitted transport block 1, terminal device 1 places the retransmitted transport block 1 in corresponding soft buffer 1 for combination and decoding. After receiving retransmitted soft buffer 1, terminal device 2 discards received transport block 1 because transport block 1 corresponding to HARQ process 1 has been successfully decoded and the transmission is retransmission. In this example, the transport block transmitted in the multicast transmission mode is retransmitted in the multicast transmission mode.

In the foregoing solution, the terminal device can receive, based on scheduling information from a network, the first transport block sent by the network device, determine the first HARQ process based on the transmission indication information and the first HARQ information that are determined based on the scheduling information, and allocate the first transport block to the first HARQ process based on the transmission indication information. In this way, for different transport blocks, for example, different transmission modes (multicast or unicast) may be used, the transport block may be allocated to the HARQ process based on different transmission indication information, to ensure that a HARQ mechanism is applicable to a scenario in which the transport block is scheduled in the different transmission modes. In addition, in the foregoing solution, multicast transmission and unicast transmission may share a same HARQ process number, but correspond to different soft buffers, and retransmission and combination of a transport block transmitted in the multicast mode and a transport block transmitted in the unicast mode are independently performed in respective soft buffers. In this way, a multicast HARQ mechanism can be supported without increasing complexity of the terminal device, and difficulty for coordinating a process number is avoided when the multicast transmission and the unicast transmission are simultaneously performed.

This embodiment of this application is described by using an example in which the unicast transmission mode and the multicast transmission mode are distinguished from each other based on the transmission indication information. In addition, when a same transmission mode is used, different services may be transmitted. For example, when the G-RNTI is used for scrambling, different G-RNTIs may be used for scrambling. The different G-RNTIs correspond to first transport blocks of different multicast services. Therefore, in addition to indicating transmission modes of the first transport blocks, the transmission indication information may further indicate transmission of different services in the same transmission mode (for example, all are the multicast transmission). For example, scrambling performed by using the different G-RNTIs represents transmission for different services. Therefore, the method described in this embodiment of this application is further applicable to HARQ processes for different MBMS services, to be specific, determining, based on the transmission indication information and the HARQ information, HARQ processes or soft buffers corresponding to different MBMS service transport blocks. For example, it may be determined, based on different G-RNTI scrambling, that transport blocks belong to different services. Therefore, different HARQ may be respectively performed for transmission scrambled by using the different G-RNTIs (even if HARQ process numbers are the same). Therefore, it is ensured that the HARQ mechanism is applicable to a scenario in which transport blocks of different services are scheduled by using a same transmission mode.

Figure 6:
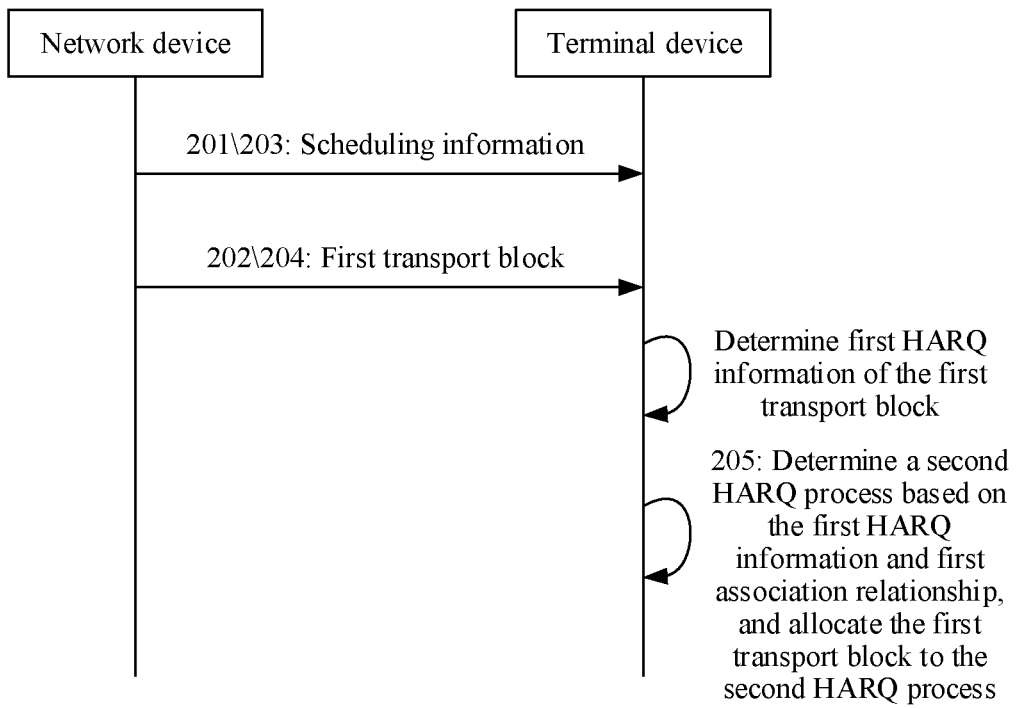
FIG. 6 is a schematic flowchart of a data transmission method according to another embodiment of this application.

FIG. 6 shows a data transmission method according to another embodiment of this application, including the following steps.

201: A network device sends scheduling information to a terminal device.

For a specific explanation of the scheduling information, refer to step 101. Details are not described herein again.

202: The network device sends a first transport block to the terminal device based on the scheduling information.

203: The terminal device receives the scheduling information from the network device.

Step 203 may further include: determining transmission indication information based on the scheduling information, where the transmission indication information includes indication information of a multicast transmission mode or indication information of a unicast transmission mode. The transmission indication information includes a scrambling manner of first scheduling information, where the scrambling manner includes a C-RNTI or a G-RNTI, and when the scrambling manner is the C-RNTI, a transmission mode of the first transport block is the unicast transmission mode; or when the scrambling manner is the G-RNTI, a transmission mode of the first transport block is the multicast transmission mode. When different G-RNTIs are used for scrambling, transmission of the first transport block corresponds to different MBMS services.

204: The terminal device receives the first transport block from the network device based on the scheduling information, and determines first hybrid automatic repeat request HARQ information of the first transport block.

205: The terminal device determines a second HARQ process based on the first HARQ information and a first association relationship, and allocates the first transport block to the second HARQ process, where the first association relationship includes a correspondence between a first HARQ process corresponding to the first HARQ information and a second HARQ process.

Step 205 is specifically: determining a second soft buffer of the second HARQ process based on the first HARQ information and the first association relationship; and allocating the first transport block to the second soft buffer of the second HARQ process.

In addition, in step 205, the terminal device may directly determine the second HARQ process based on the first HARQ information and the first association relationship, or indirectly determine the second HARQ process. The following manner of indirectly determining the second HARQ process is: the determining a second HARQ process based on the first HARQ information and a first association relationship includes: determining the first HARQ process based on the first HARQ information; and determining the second HARQ process based on the first HARQ process and the first association relationship. In addition, a manner of determining whether the first transport block is newly transmitted or retransmitted is provided. The first HARQ information includes an NDI, and the allocating the first transport block to the second soft buffer of the second HARQ process further includes: if it is determined that the NDI is not toggled, decoding data obtained by combining data of the first HARQ process and data of the second soft buffer of the second HARQ process; or if it is determined that the NDI is toggled, decoding data of the first transport block.

Figure 7:
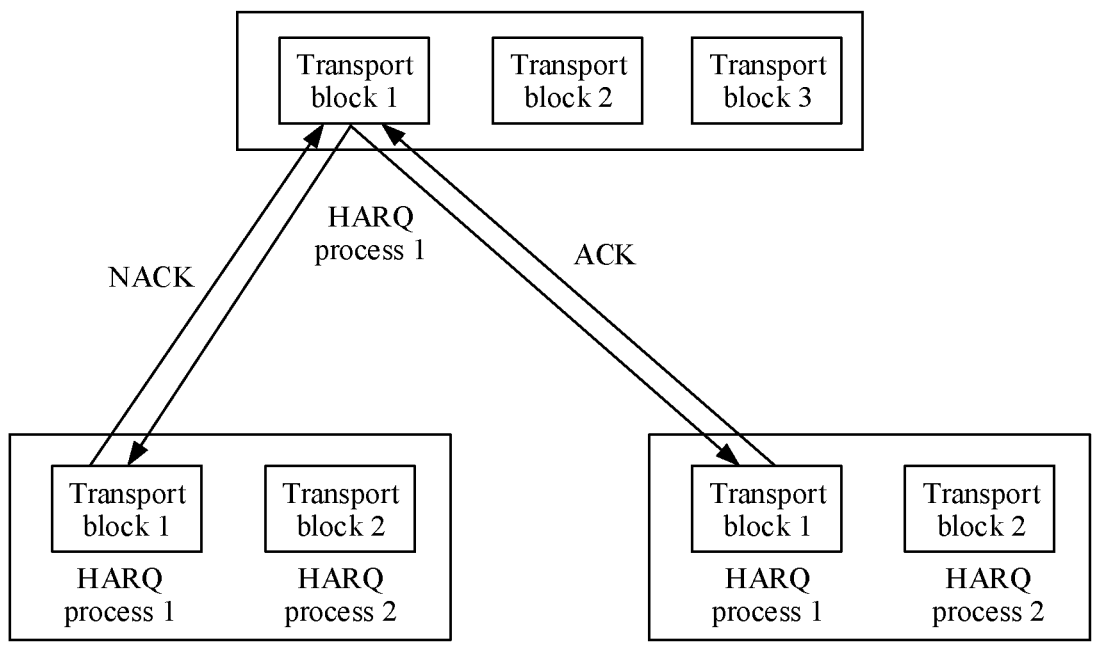
FIG. 7 is a schematic diagram of a data transmission method according to still another embodiment of this application.
Figure 8:
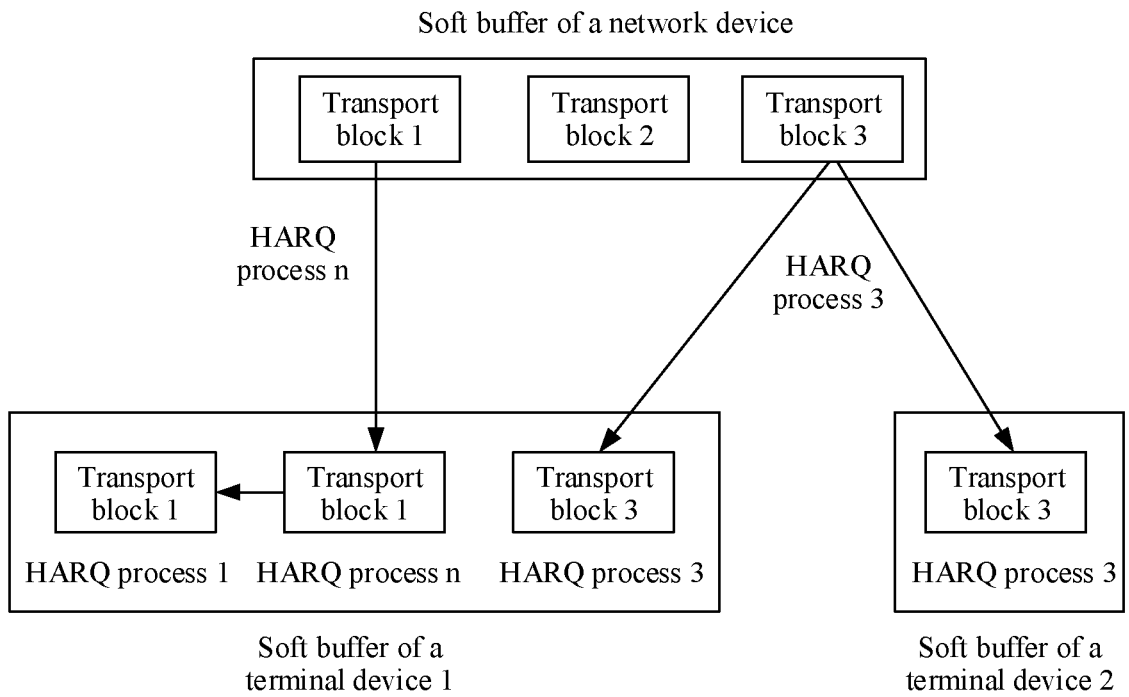
FIG. 8 is a schematic diagram of a data transmission method according to yet another embodiment of this application.

Refer to FIG. 7. It is assumed that the network device sends transport block 1 to terminal device 1 and terminal device 2 in a multicast transmission mode (where scheduling information is scrambled by using a G-RNTI). If transport block 1 is sent by using HARQ process 1 during new transmission, and terminal device 1 fails to decode transport block 1 but terminal device 2 successfully decodes transport block 1, terminal device 1 places transport block 1 that fails to be decoded in soft buffer 1 corresponding to the HARQ process 1 to wait for combination and decoding, but terminal device 2 submits transport block 1 that is successfully decoded to a MAC layer for further processing, and then the MAC layer submits processed transport block 1 to a radio link control (radio link control, RLC) layer. Refer to FIG. 8. After receiving a NACK fed back by terminal device 1, a network device retransmits transport block 1 to terminal device 1 in a unicast transmission mode (where scheduling information is scrambled by using a C-RNTI), and performs transmission by using process n. Process n is a process associated with process 1. Terminal device 1 may learn, based on an association relationship, that retransmitted transport block 1 needs to be placed in a soft buffer corresponding to HARQ process 1 for HARQ combination. A manner of obtaining the association relationship includes: obtaining a first association relationship in a protocol. For example, if it is specified in the protocol that HARQ process 1 is used to perform new transmission of a transport block in a multicast transmission mode, HARQ process 4 is used to perform retransmission in the unicast transmission mode. Alternatively, the association relationship is determined based on RRC signaling from the network device. For example, when multicast or HARQ is configured, an association relationship between processes is carried in the RRC signaling. Optionally, one piece of indication information may be further carried to indicate a process number used only for unicast transmission and a process number used only for multicast transmission. Alternatively, the association relationship is determined based on DCI from the network device. For example, when the DCI uses the unicast transmission mode to perform retransmission of a transport block transmitted in the multicast transmission mode, in addition to a HARQ process number of the transport block retransmitted in the unicast transmission mode, indication information is further carried to indicate that the retransmission is specific to multicast retransmission. In addition, a multicast HARQ process number may be further carried to indicate a multicast process for which the retransmission is performed. In this way, the terminal device may know a previous transport block with which the retransmitted transport block needs to be combined and decoded. Alternatively, the association relationship is determined based on a media access control control element MAC CE from the network device.

To determine that a first transport block is retransmitted for data corresponding to a second HARQ process associated with a first HARQ process, the method further includes: obtaining first indication information, where the first indication information indicates that the first transport block is retransmitted for the data corresponding to the second HARQ process. A manner of obtaining the indication information includes: determining the indication information based on DCI from a first communication apparatus; or determining the indication information based on a scrambling manner of the first transport block. When the DCI is used to determine the indication information, a new field may be carried in the DCI; or DCI in a special format may be used, for example, may be DCI different from common DCI, and may be specifically newly added DCI; or a redundancy version (redundant version, RV) in the DCI is used. For example, when the indication information is determined based on the scrambling manner of the first transport block, if it is determined that the transport block is scrambled by using the G-RNTI, when the terminal device performs decoding, if descrambling by using the G-RNTI succeeds, it is determined that the transport block transmitted in the multicast transmission mode is retransmitted; or if descrambling by using the C-RNTI succeeds, it is determined that the transport block transmitted in the unicast transmission mode is retransmitted.

Figure 9:
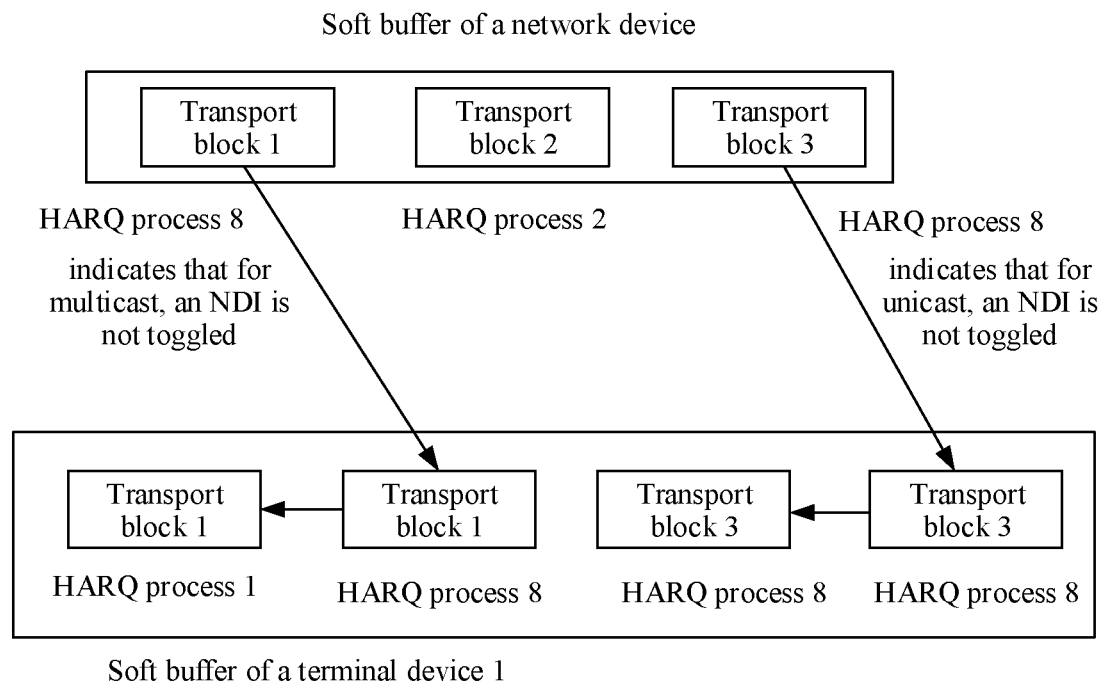
FIG. 9 is a schematic diagram of a data transmission method according to another embodiment of this application.

Refer to FIG. 9. A specific example of a data transmission method is provided. For example, HARQ process n used for transmission in a unicast transmission mode is used to retransmit transport block 1 transmitted by using HARQ process 1 used for transmission in a multicast transmission mode. Herein, for ease of description, it is assumed that n=8. As shown in FIG. 9, a case may further occur in this embodiment. To be specific, HARQ process 8 is not only used for retransmission that uses HARQ process 1, but also used for new transmission of unicast transmission. It is assumed that the network device uses HARQ process 8 to send unicast transport block 3 (where unicast transport block 3 is scrambled by using a C-RNTI and an NDI is toggled, and therefore it is new transmission) to terminal device 1. In this case, assuming that terminal device 1 successfully decodes unicast transport block 3, unicast transport block 3 is submitted to a MAC layer for further processing. It is assumed that terminal device 1 fails to decode unicast transport block 3. In this case, terminal device 1 places transport block 3 in a soft buffer corresponding to HARQ process 8 to wait for combination and decoding. At the same time, terminal device 1 feeds back a NACK corresponding to unicast to a network device. After receiving the NACK, the network device retransmits transport block 3 in the unicast transmission mode, and still uses HARQ process 8. In this case, another problem occurs: When the terminal device retransmits a transport block in the unicast transmission mode, how does the terminal device distinguish whether the retransmission is retransmission for previous unicast transport block 3 or retransmission for multicast transport block 1 (where regardless of whether the retransmission is for unicast or multicast, in this case, all scrambling is performed by using the C-RNTI, and no NDI is toggled). In this case, additional indication information is required for differentiation. For example, first indication information may indicate that transport block 1 retransmitted by the terminal device in the unicast transmission mode is retransmitted for the transport block 3 corresponding to the HARQ process 8. The terminal device determines whether the transport block retransmitted in the unicast transmission mode is retransmitted for the transport block 3 that previously fails to be transmitted in the unicast transmission mode or the transport block 1 that previously fails to be transmitted in the multicast transmission mode, and then places the transport block in a corresponding soft buffer for combination and decoding. In the foregoing solution, the transport block in the multicast transmission mode or the transport block in the unicast transmission mode is retransmitted in the unicast transmission mode.

In the foregoing solution, the second communication apparatus can receive, based on the scheduling information from the first communication apparatus, the first transport block sent by the first communication apparatus, determine the first HARQ information determined based on the scheduling information and the first association relationship that includes the correspondence between a first HARQ process corresponding to the first HARQ information and a second HARQ process, and allocate the first transport block to the second HARQ process. In this way, for a retransmitted transport block, a second HARQ process different from that used during new transmission may be used, to ensure that a HARQ mechanism adapts to different transmission modes of the transport block. In addition, in the foregoing solution, a multicast transport block is retransmitted in the unicast transmission mode, and for a HARQ process for unicast transmission and a HARQ process for multicast transmission, combination processes may be respectively performed. In this way, the HARQ process for unicast transmission and the HARQ process for multicast transmission do not affect each other, and reliability of both the unicast transmission and the multicast transmission is improved.

In this embodiment, when retransmission is performed by using unicast, a method for distinguishing whether the retransmission is retransmission for multicast or retransmission for unicast is provided. The method is further applicable to another scenario, for example, distinguishing whether retransmission is retransmission for multicast service 1 or retransmission for multicast service 2, or distinguishing whether retransmission is retransmission for unicast service 1 or retransmission for unicast service 2. Even different transport blocks of a same service may be transmitted by using a same process number. In this case, during retransmission, a transport block for which the retransmission is performed further needs to be indicated. Details are not described herein.

Figure 10:
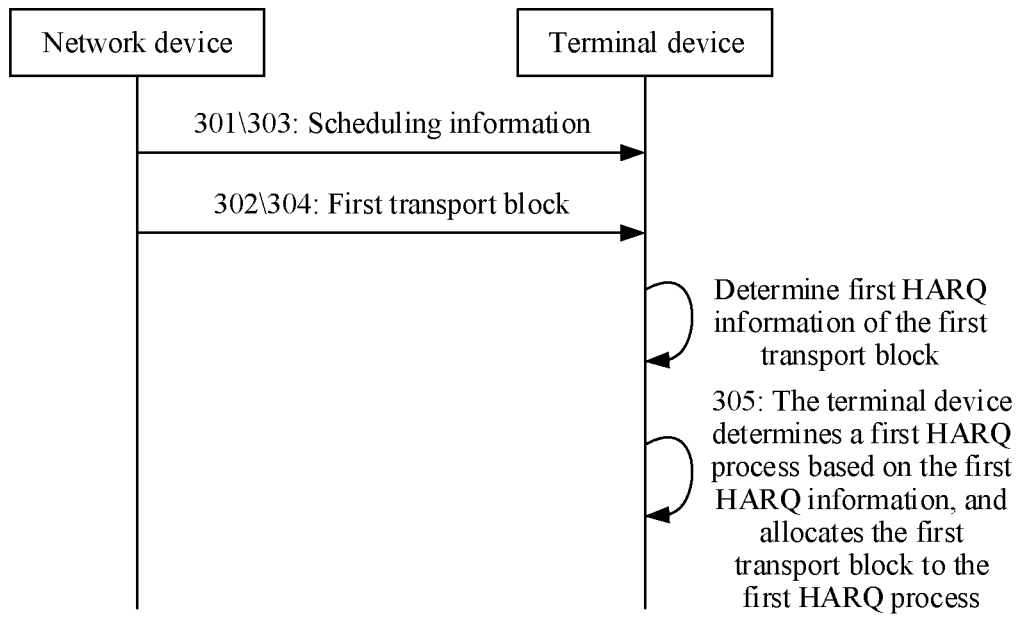
FIG. 10 is a schematic flowchart of a data transmission method according to still another embodiment of this application.

FIG. 10 shows a data transmission method according to an embodiment of this application, including the following steps.

301: A network device sends scheduling information to a terminal device.

For a specific explanation of the scheduling information, refer to step 101. Details are not described herein again.

302: The network device sends a first transport block to the terminal device based on the scheduling information.

303: The terminal device receives the scheduling information from the network device.

304: The terminal device receives the first transport block from the network device based on the scheduling information, and determines first hybrid automatic repeat request HARQ information of the first transport block.

305: The terminal device determines a first HARQ process based on the first HARQ information, and allocates the first transport block to the first HARQ process.

According to the foregoing method, for a newly transmitted transport block, a transport block transmitted in a multicast transmission mode and a transport block transmitted in a unicast transmission mode cannot use a same HARQ process at the same time. The terminal device sets a corresponding soft buffer for each HARQ process. It is assumed that after the transport block transmitted in the unicast transmission mode uses one HARQ process number and a corresponding soft buffer, the transport block transmitted in the multicast transmission mode cannot use the same HARQ process number, and can use only another HARQ process number and a corresponding soft buffer. In addition, in this embodiment, to prevent a terminal device that has successfully decoded a transport block from repeatedly receiving the transport block, retransmission of the transport block transmitted in the multicast transmission mode may be performed in the unicast transmission mode. In this case, the terminal device further needs to obtain second indication information, where the second indication information indicates that the first transport block is retransmitted for data corresponding to a second HARQ process. A manner of obtaining the indication information includes: determining the indication information based on DCI from a first communication apparatus; or determining the indication information based on a header of the first transport block. For example, the indication information may be a logical channel identifier or a logical channel type identifier (for example, a logical channel for multicast data or a logical channel for unicast data) in the header of the transport block. When the DCI is used to determine the indication information, a new field may be carried in the DCI; or DCI in a special format may be used, for example, may be DCI different from common DCI, and may be specifically newly added DCI; or a redundancy version (redundant version, RV) in the DCI is used. It should be noted herein that, usually, if the terminal device receives the transport block in the unicast transmission mode, after successful decoding, the terminal device needs to submit the transport block to a logical channel or an RLC entity that is used to receive the unicast data. However, in this embodiment, because a transport block transmitted in the unicast transmission mode is retransmitted for a transport block transmitted in the multicast transmission mode, the transport block needs to be submitted to a logical channel (logical channel, LCH) or an RLC entity that is used to receive the multicast data. Therefore, after the indication information is received, the transport block successfully received is sent to the logical channel or the RLC entity that receives the multicast data.

Figure 11:
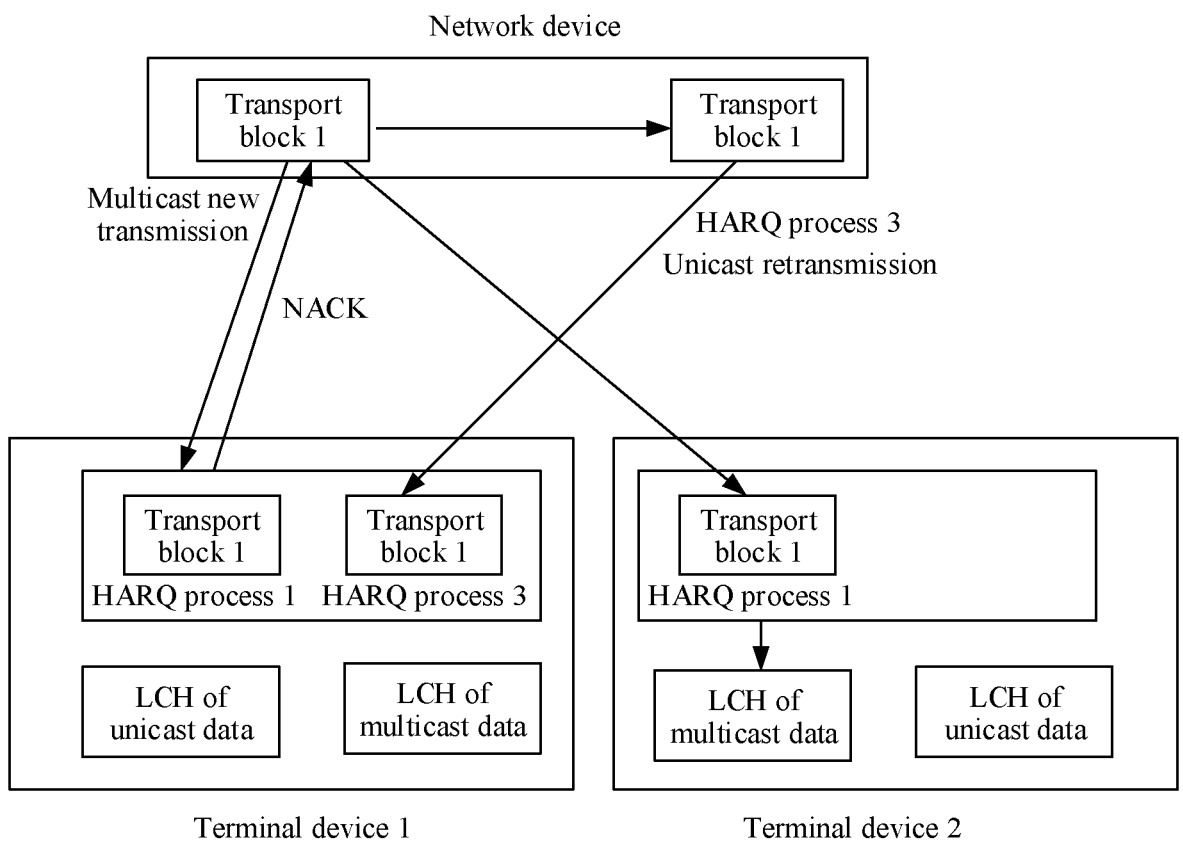
FIG. 11 is a schematic diagram of a data transmission method according to yet another embodiment of this application.

As shown in FIG. 11, transport block 1 is sent to terminal device 1 and terminal device 2 in a multicast transmission mode (for example, scheduling information is scrambled by using a G-RNTI). If transport block 1 is sent by using HARQ process 1 during new transmission, and terminal device 1 fails to perform decoding but terminal device 2 successfully performs decoding, terminal device 1 discards data that fails to be decoded, and terminal device 2 submits data that is successfully decoded to a MAC layer for further processing and then the MAC layer submits processed data to an RLC layer. After receiving a NACK fed back by terminal device 1, a network device retransmits transport block 1 to terminal device 1 in a unicast transmission mode (for example, scheduling information is scrambled by using a C-RNTI), and used HARQ process 3 may be different from HARQ process 1 used for previous new transmission. After terminal device 1 receives retransmitted transport block 1, if determining that decoding succeeds, terminal device 1 submits, based on the indication information, transport block 1 to an LCH or an RLC entity used to receive multicast data, instead of submitting transport block 1 to an LCH or an RLC entity that is used to receive unicast data.

In this way, for different transport blocks, for example, different transmission modes (multicast or unicast) may be used, and the transport blocks may be allocated to the HARQ process based on different first HARQ information (which, for example, may be a HARQ process number), for example, transport blocks in the different transmission modes correspond to different HARQ processes, to ensure that a HARQ mechanism is applicable to the different transmission modes of transport blocks.

With reference to the foregoing embodiment, the network device further needs to determine configuration information based on capability information of the terminal device, where when the configuration information includes the first HARQ information, the capability information includes that a HARQ process corresponding to the first HARQ information corresponds to at least one soft buffer. In this embodiment, that one HARQ process corresponds to more than one soft buffer may be reported to a core network device as capability information of one terminal device, and the core network device may forward the capability information to the network device; or the terminal device directly reports the capability information to the network device. In another implementation, the terminal device reports capability information indicating whether multicast transmission is supported, and the network device determines, based on the capability information indicating that the multicast transmission is supported, a capability that the terminal device supports a capability that one HARQ process corresponds to more than one soft buffer. After learning of the capability information of the terminal device, the network device may indicate, in the configuration information, that some HARQ processes of the terminal device correspond to more than one soft buffer (for example, correspond to two soft buffers). In another implementation, the network device does not need to perform additional configuration, and it is agreed upon, by using a protocol, that a process used for multicast transmission corresponds to more than one soft buffer.

Generally, a total quantity or a total size of soft buffers supported by one HARQ entity of the terminal device has an upper limit. In an implementation, the terminal device supports a maximum of eight HARQ processes for one HARQ entity, process numbers are 0 to 7, and each process corresponds to one soft buffer.

In another implementation, the terminal device supports a maximum of eight soft buffers for one HARQ entity, and one process number may correspond to a plurality of soft buffers. In this case, the soft buffers may be fully occupied, and some HARQ processes cannot obtain the soft buffers. For example, HARQ process 0 occupies two soft buffers, one is unicast HARQ process 0, and the other is multicast HARQ process 0. In addition, processes 1 to 6 each occupy one soft buffer, and the soft buffers have been fully occupied by processes 0 to 6. Because a maximum quantity of process numbers is also 8, when using HARQ process 7 to schedule a newly transmitted transport block, the network device cannot allocate the soft buffer for HARQ process 7 in the terminal device. In this case, the terminal device may perform a corresponding operation according to some rules.

In an implementation, the terminal device ignores, does not receive, or discards a transport block corresponding to HARQ process 7, and sends feedback information to the network device to indicate an operation of the terminal device. The network device may determine a next operation based on the feedback. For example, the network device may use an occupied process to occupy a corresponding soft buffer, or may perform scheduling after the terminal device has a free soft buffer. Behavior of the network device is not limited.

In another implementation, after all the soft buffers are fully occupied, the terminal device sequentially clears the corresponding soft buffers in a time sequence of occupying the soft buffers by the HARQ process, so that new transmission may occupy the cleared soft buffers. For example, it is assumed that HARQ process 0 first occupies one soft buffer, and after the soft buffers are fully occupied, if new transmission scheduled by a new HARQ process 7 arrives, the new HARQ process 7 preferentially clears and uses the soft buffer that is first occupied by the HARQ process 0. This implementation may further impose a limitation indicating that only HARQ processes of a same transmission mode (for example, all use multicast transmission) or HARQ processes specific only to a same service (for example, a same G-RNTI is used) are allowed to clear and occupy soft buffers of each other. For example, in the foregoing example, HARQ process 7 and HARQ process 0 correspond to the same transmission mode or the same service.

In another implementation, after all the soft buffers are fully occupied, the terminal device sequentially clears the corresponding soft buffers in a specific priority sequence, so that new transmission may occupy the cleared soft buffers. Priorities are configured by the network device for the terminal device, and priorities are different for different transmission modes or different services in same transmission. For example, it is assumed that HARQ process 0 first occupies one soft buffer, and the HARQ process 0 corresponds to a lowest priority. After the soft buffers are fully occupied, if a newly transmitted transport block scheduled by new HARQ process 7 arrives, new HARQ process 7 preferentially clears and uses the soft buffer occupied by the HARQ process 0.

In the solution provided in FIG. 11, the multicast data is retransmitted in the unicast transmission mode, and a combination process does not need to be performed for a multicast HARQ process. A terminal device that has successfully received a transport block in multicast transmission no longer needs to receive a retransmitted transport block. Therefore, power consumption of these terminal devices is reduced, and a combination and decoding process does not need to be performed, thereby reducing complexity of the terminal device.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in embodiments of this application from the perspective of interaction between network elements. Correspondingly, an embodiment of this application further provides a communication apparatus, and the communication apparatus is configured to implement the foregoing method. The communication apparatus may be the terminal device in the foregoing method embodiments, an apparatus including the foregoing terminal device, or a component that can be used in the terminal device. Alternatively, the communication apparatus may be the network device in the foregoing method embodiments, an apparatus including the foregoing network device, or a component that can be used in the network device. It may be understood that, to implement the foregoing functions, the communication apparatus includes a corresponding hardware structure and/or software module for performing the functions. A person skilled in the art should be easily aware that, in combination with the examples of units and algorithm steps described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented by hardware, or may be implemented by a software functional module. It should be noted that in embodiments of this application, division into the modules is an example and is merely logical function division, and may be other division in actual implementation.

Figure 12:
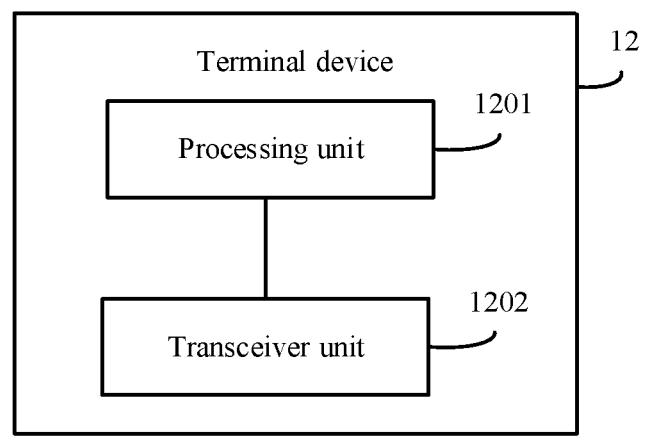
FIG. 12 is a schematic diagram of a structure of a terminal device according to another embodiment of this application.

For example, the communication apparatus is the terminal device in the foregoing method embodiments. FIG. 12 shows a schematic diagram of a structure of a terminal device 12. The terminal device includes a processing unit 1201 and a transceiver unit 1202. The transceiver unit 1202 may also be referred to as a transceiver module configured to implement a sending function and/or a receiving function, for example, may be a transceiver circuit, a transceiver, or a communication interface.

In an implementation, the transceiver unit 1202 is configured to receive scheduling information from a first communication apparatus.

The processing unit 1201 is configured to determine transmission indication information based on the scheduling information received by the transceiver unit 1202. The transceiver unit 1202 is further configured to receive a first transport block from the first communication apparatus based on the scheduling information. The processing unit 1201 is further configured to determine first hybrid automatic repeat request HARQ information of the first transport block received by the transceiver unit 1202. The processing unit 1201 is further configured to: determine a first HARQ process based on the first HARQ information and the transmission indication information, and allocate the first transport block to the first HARQ process.

Optionally, the processing unit 1201 is specifically configured to: determine a first soft buffer of the first HARQ process based on the first HARQ information and the transmission indication information, and allocate the first transport block to the first soft buffer of the first HARQ process.

Optionally, the transmission indication information includes indication information of a multicast transmission mode and indication information of a unicast transmission mode.

Optionally, the transmission indication information includes a scrambling manner of the scheduling information, where the scrambling manner includes a cell radio network temporary identifier C-RNTI or a group radio network temporary identifier G-RNTI, and when the scrambling manner is the C-RNTI, a transmission mode of the first transport block is a unicast transmission mode; or when the scrambling manner is the G-RNTI, a transmission mode of the first transport block is a multicast transmission mode.

Optionally, the first HARQ information includes a new data indicator NDI, and the processing unit 1201 is further configured to: if it is determined that the NDI is not toggled, decode data obtained by combining data of the first transport block and data of the first soft buffer; or if it is determined that the NDI is toggled, decode data of the first transport block.

Optionally, the transceiver unit 1202 is further configured to send an acknowledgement ACK to the first communication apparatus when the processing unit 1201 determines that the data of the first transport block is successfully decoded, or determines that the data obtained by combining the data of the first transport block and the data of the first soft buffer is successfully decoded. The processing unit 1201 is further configured to: when it is determined that the data of the first transport block fails to be decoded, or when it is determined that the data obtained by combining the data of the first transport block and the data of the first soft buffer fails to be decoded, replace the data of the first soft buffer with the data of the first transport block or the data obtained by combining the data of the first transport block and the data of the first soft buffer. The transceiver unit is further configured to send a negative acknowledgement NACK to the first communication apparatus.

In an implementation, the transceiver unit 1202 is configured to receive scheduling information from the first communication apparatus. The transceiver unit 1202 is further configured to receive the first transport block from the first communication apparatus based on the scheduling information. The processing unit 1201 is configured to: determine first hybrid automatic repeat request HARQ information of the first transport block received by the transceiver unit 1202; and determine a second HARQ process based on the first HARQ information and a first association relationship, and allocate the first transport block to the second HARQ process, where the first association relationship includes a correspondence between a first HARQ process corresponding to the first HARQ information and a second HARQ process.

Optionally, the processing unit 1201 is specifically configured to: determine a second soft buffer of the second HARQ process based on the first HARQ information and the first association relationship, and allocate the first transport block to the second soft buffer of the second HARQ process.

Optionally, the processing unit 1201 is specifically configured to: determine the first HARQ process based on the first HARQ information, and determine the second HARQ process based on the first HARQ process and the first association relationship.

Optionally, the first HARQ information includes an NDI; and the processing unit 1201 is further configured to: if it is determined that the NDI is not toggled, decode data obtained by combining data of the first HARQ process and data of the second soft buffer of the second HARQ process; or if it is determined that the NDI is toggled, decode data of the first transport block.

Optionally, the processing unit 1201 is further configured to determine transmission indication information based on the scheduling information, where the transmission indication information includes indication information of a multicast transmission mode or indication information of a unicast transmission mode.

Optionally, the transmission indication information includes a scrambling manner of first scheduling information, where the scrambling manner includes a C-RNTI or a G-RNTI, and when the scrambling manner is the C-RNTI, a transmission mode of the first transport block is a unicast transmission mode; or when the scrambling manner is the G-RNTI, a transmission mode of the first transport block is a multicast transmission mode.

Optionally, the processing unit 1201 is further configured to obtain the first association relationship in a protocol; or determine the first association relationship based on radio resource control RRC signaling from the first communication apparatus; or determine the first association relationship based on a media access control control element MAC CE from the first communication apparatus; or determine the first association relationship based on downlink control information DCI from the first communication apparatus.

Optionally, the processing unit 1201 is further configured to obtain first indication information, where the first indication information indicates that the first transport block is retransmitted for data corresponding to the second HARQ process.

Optionally, the processing unit 1201 is specifically configured to determine the indication information based on the DCI from the first communication apparatus; or determine the indication information based on a scrambling manner of the first transport block.

In an implementation, the transceiver unit 1202 is configured to receive scheduling information from the first communication apparatus; the transceiver unit 1202 receives the first transport block from the first communication apparatus based on the scheduling information; the processing unit 1201 is configured to determine first hybrid automatic repeat request HARQ information of the first transport block received by the transceiver unit 1202; and the processing unit 1201 determines the first HARQ process based on the first HARQ information; and allocates the first transport block to the first HARQ process.

Optionally, the processing unit 1201 is further configured to obtain second indication information, where the second indication information indicates that the first transport block is retransmitted for data corresponding to the second HARQ process. A manner of obtaining the indication information includes: determining the indication information based on DCI from the first communication apparatus; or determining the indication information based on a header of the first transport block. When the DCI is used to determine the indication information, a new field may be carried in the DCI; or DCI in a special format may be used, for example, may be DCI different from common DCI, and may be specifically newly added DCI; or a redundancy version (redundant version, RV) in the DCI is used.

Optionally, the processing unit 1201 is specifically configured to: determine the first buffer of the first HARQ process based on the first HARQ information, and allocate the first transport block to the first soft buffer of the first HARQ process.

Optionally, the first HARQ information includes the NDI, and the processing unit 1201 is configured to: if it is determined that the NDI is not toggled, decode data of the first transport block; or if it is determined that the NDI is toggled, decode data of the first transport block. In addition, when the processing unit 1201 determines that the data of the first transport block is successfully decoded, the transceiver unit 1202 is configured to send an acknowledgement ACK to the first communication apparatus. When the processing unit 1201 determines that the data of the first transport block fails to be decoded, the transceiver unit is configured to send a negative acknowledgement NACK to the first communication apparatus.

All related content of the steps in this method embodiment may be cited in function descriptions of corresponding functional modules. Details are not described herein again.

In this embodiment, the terminal device is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the terminal device may be in a form of the terminal device shown in FIG. 2.

For example, the processor 301 in the terminal device 30 in FIG. 2 may invoke the computer-executable instructions stored in the memory 302, so that the terminal device 30 is enabled to perform the data transmission method in the foregoing method embodiments.

Specifically, functions/implementation processes of the processing unit 1201 and the transceiver unit 1202 in FIG. 12 may be implemented by the processor 301 in the terminal device 30 shown in FIG. 2 by invoking the computer-executable instructions stored in the memory 302. Alternatively, a function/an implementation process of the processing unit 1201 in FIG. 12 may be implemented by the processor 301 in the terminal device 30 shown in FIG. 2 by invoking the computer-executable instructions stored in the memory 302, and a function/an implementation process of the transceiver unit 1202 in FIG. 12 may be implemented by the transceiver 303 in the terminal device 30 shown in FIG. 2.

Because the terminal device 12 provided in this embodiment may perform the foregoing data transmission method, for a technical effect that can be achieved by the terminal device 12, refer to the foregoing method embodiments. Details are not described herein again.

Figure 13:
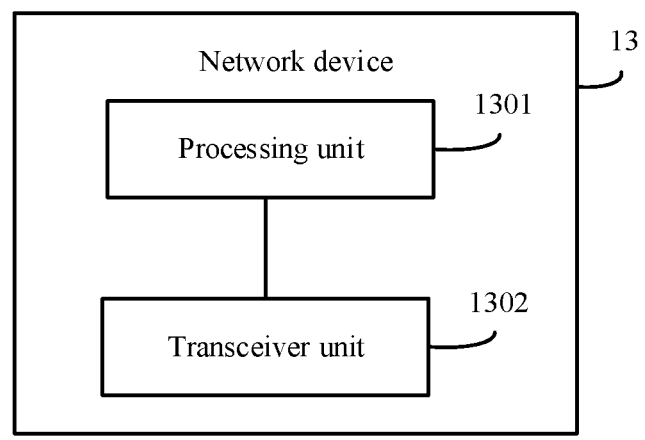
FIG. 13 is a schematic diagram of a structure of a network device according to another embodiment of this application.

Alternatively, for example, an example in which the communication apparatus is the network device in the foregoing method embodiments is used. FIG. 13 shows a schematic diagram of a structure of a network device 13. The network device 13 includes a processing unit 1301 and a transceiver unit 1302. The transceiver unit 1302 may also be referred to as a transceiver module configured to implement a sending function and/or a receiving function, for example, may be a transceiver circuit, a transceiver, or a communication interface.

In an example solution, the transceiver unit 1302 is configured to send scheduling information to a second communication apparatus, where the scheduling information is used by the second communication apparatus to determine transmission indication information. The transceiver unit 1302 is further configured to send a first transport block to the second communication apparatus. The second communication apparatus receives the first transport block from a first communication apparatus based on the scheduling information, determines first hybrid automatic repeat request HARQ information of the first transport block, determines a first HARQ process based on the first HARQ information and the transmission indication information, and allocates the first transport block to the first HARQ process based on the transmission indication information.

Optionally, the transceiver unit 1302 is further configured to receive an ACK sent by the second communication apparatus; or receive a NACK sent by the second communication apparatus.

Optionally, the processing unit 1301 is configured to determine configuration information based on capability information of the second communication apparatus, where the configuration information includes the first HARQ information, and the capability information includes that a HARQ process corresponding to the first HARQ information corresponds to at least one soft buffer. The transceiver unit 1302 receives the capability information from the second communication apparatus, or the processing unit 1301 determines the capability information of the second communication apparatus according to a protocol.

Optionally, the processing unit 1301 is further configured to determine configuration information based on the capability information of the second communication apparatus, where the configuration information includes the first HARQ information, and the capability information includes that a HARQ process corresponding to the first HARQ information corresponds to at least one soft buffer. The transceiver unit 1302 is configured to receive the capability information from the second communication apparatus, or the processing unit 1301 determines the capability information according to a protocol.

In an example solution, the transceiver unit 1302 is configured to send scheduling information to the second communication apparatus. The transceiver unit 1302 is configured to send the first transport block to the second communication apparatus. The second communication apparatus receives the first transport block from the first communication apparatus based on the scheduling information, determines the first hybrid automatic repeat request HARQ information of the first transport block, determines a second HARQ process based on the first HARQ information and a first association relationship, and allocates the first transport block to the second HARQ process, where the first association relationship includes a correspondence between a first HARQ process corresponding to the first HARQ information and a second HARQ process.

Optionally, the transceiver unit 1302 is further configured to send RRC signaling that carries the first association relationship to the second communication apparatus; or send DCI that carries the first association relationship to the second communication apparatus.

Optionally, the transceiver unit 1302 is further configured to send DCI that carries first indication information to the second communication apparatus, where the first indication information indicates that the first transport block is retransmitted for data corresponding to the second HARQ process.

Optionally, the processing unit 1301 is further configured to determine configuration information based on the capability information of the second communication apparatus, where the configuration information includes the first HARQ information, and the capability information includes that a HARQ process corresponding to the first HARQ information corresponds to at least one soft buffer. The transceiver unit 1302 is configured to receive the capability information from the second communication apparatus, or the processing unit 1301 determines the capability information according to a protocol.

In an example solution, the transceiver unit 1302 is configured to send scheduling information to the second communication apparatus. The transceiver unit 1302 is configured to send the first transport block to the second communication apparatus. The second communication apparatus receives the first transport block from the first communication apparatus based on the scheduling information, determines the first hybrid automatic repeat request HARQ information of the first transport block, determines the first HARQ process based on the first HARQ information, and allocates the first transport block to the first HARQ process.

Optionally, the transceiver unit 1302 is configured to send DCI that carries second indication information to the second communication apparatus, where the second indication information indicates that the first transport block is retransmitted for data corresponding to the second HARQ process.

Optionally, the transceiver unit 1302 is configured to receive an ACK sent by the second communication apparatus; or receive a NACK sent by the second communication apparatus.

Optionally, the processing unit 1301 is further configured to determine configuration information based on the capability information of the second communication apparatus, where the configuration information includes the first HARQ information, and the capability information includes that a HARQ process corresponding to the first HARQ information corresponds to at least one soft buffer. The transceiver unit 1302 is configured to receive the capability information from the second communication apparatus, or the processing unit 1301 determines the capability information according to a protocol.

All related content of the steps in the method embodiments may be cited in function descriptions of corresponding functional modules. Details are not described herein again.

In this embodiment, the network device 13 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the network device 13 may use a form of the network device 20 shown in FIG. 2.

For example, the processor 201 in the network device 20 shown in FIG. 2 may invoke the computer-executable instructions stored in the memory 202, so that the network device 20 is enabled to perform the data transmission method in the foregoing method embodiments.

Specifically, functions/implementation processes of the processing unit 1301 and the transceiver unit 1302 in FIG. 13 may be implemented by the processor 201 in the network device 20 shown in FIG. 2 by invoking the computer-executable instructions stored in the memory 202. Alternatively, a function/an implementation process of the processing unit 1301 in FIG. 13 may be implemented by the processor 201 in the network device 20 shown in FIG. 2 by invoking the computer-executable instructions stored in the memory 202, and a function/an implementation process of the transceiver unit 1302 in FIG. 13 may be implemented by the transceiver 203 in the network device 20 shown in FIG. 2.

Because the network device 13 provided in this embodiment may perform the foregoing data transmission method, for a technical effect that can be achieved by the network device 13, refer to the foregoing method embodiments. Details are not described herein again.

Optionally, an embodiment of this application further provides a communication apparatus (for example, the communication apparatus may be a chip or a chip system). The communication apparatus includes a processor and an interface, and the processor is configured to read instructions to perform the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. When the communication apparatus is a chip system, the communication apparatus may include a chip, or may include a chip and another discrete component. This is not specifically limited in this embodiment of this application.

Specifically, when the second communication apparatus is a terminal device, and when the first communication apparatus is a network device, the transceiver unit 1202 and the transceiver unit 1302 each may be a sending unit or a transmitter when sending information, and the transceiver unit 1202 and the transceiver unit 1302 each may be a receiving unit or a receiver when receiving information. The transceiver unit may be a transceiver, and the transceiver, the transmitter, or the receiver may be a radio frequency circuit. When the first communication apparatus and the second communication apparatus each include a storage unit, the storage unit is configured to store computer instructions, the processor is in communication connection with the memory, and the processor executes the computer instructions stored in the memory, so that the first communication apparatus and the second communication apparatus perform the method in the embodiment in FIG. 4, FIG. 6, or FIG. 10. The processor may be a general-purpose central processing unit (CPU), a microprocessor, or an application-specific integrated circuit (application-specific integrated circuit, ASIC).

When the first communication apparatus and the second communication apparatus are chips, the transceiver unit 1202 and the transceiver unit 1302 may be input and/or output interfaces, pins, circuits, or the like. The processing unit 1201 and the processing unit 1301 may execute the computer-executable instructions stored in the storage unit, so that chips in the first communication apparatus and the second communication apparatus perform the method in FIG. 4, FIG. 6, or FIG. 10. Optionally, the storage unit is a storage unit in the chip, for example, a register or a cache. Alternatively, the storage unit may be a storage unit that is in the terminal device or the network device and that is located outside the chip, for example, a read-only memory (read-only memory, ROM) or another type of static storage device that can store static information and instructions, or a random access memory (random access memory, RAM).

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. In embodiments of this application, the computer may include the apparatuses described above.

Although this application is described with reference to the embodiments, in a process of implementing this application that claims protection, persons skilled in the art may understand and implement another variation of the disclosed embodiments by viewing the accompanying drawings, disclosed content, and the appended claims. In the claims, the term "comprise" (comprising) does not exclude another component or another step, and "a" or "one" does not exclude a case of plurality. A single processor or another unit may implement several functions enumerated in the claims. Some measures are set forth in dependent claims that are different from each other, but this does not mean that these measures cannot be combined to produce a great effect.

Although this application is described with reference to specific features and all the embodiments thereof, it is clear that various modifications and combinations may be made to them without departing from the spirit and scope of this application. Correspondingly, this specification and the accompanying drawings are merely example descriptions of this application defined by the appended claims, and are considered as any or all of modifications, variations, combinations or equivalents that cover the scope of this application. It is clear that a person skilled in the art can make various modifications and variations to this application without departing from the spirit and scope of this application. This application is intended to cover the modifications and variations of this application provided that they fall within the scope of the claims of this application and their equivalent technologies.

What is claimed is:

1. A data transmission method, comprising:
receiving scheduling information from a network device;
obtaining second indication information, wherein the second indication information indicates that a first transport block is for retransmission, wherein the first transport block is transmitted in an unicast transmission mode, and the first transport block is for retransmission of a transport block transmitted in a multicast transmission mode;
receiving, based on the scheduling information, the first transport block from the network device;
determining a first hybrid automatic repeat request (HARQ) process identifier of the first transport block;

determining a first HARQ process based on the first HARQ process identifier; and allocating the first transport block to the first HARQ process.

2. The method according to claim 1, further comprising:
setting a corresponding soft buffer for the first HARQ process.

3. The method according to claim 1, wherein the scheduling information is scrambled by a cell radio network temporary identifier (C-RNTI).

4. The method according to claim 1, further comprising:
submitting first transport block to a logical channel or a radio link control (RLC) entity that receives multicast data.

5. A data transmission method, comprising:
sending scheduling information for determining a first hybrid automatic repeat request (HARQ) process identifier, wherein the scheduling information comprising a second indication information, wherein the second indication information indicates that a first transport block is for retransmission, wherein the first transport block is transmitted in an unicast transmission mode, and the first transport block is for retransmission of a transport block transmitted in a multicast transmission mode; and sending, based on the scheduling information, the first transport block.

6. The method according to claim 5, wherein the scheduling information is scrambled by a cell radio network temporary identifier (C-RNTI).

7. A communication apparatus, comprising:
one or more processors, and
one or more memories coupled to the one or more processors and storing programming instructions for execution by the one or more processors to cause the communication apparatus to:
receive scheduling information from a network device;
obtain second indication information, wherein the second indication information indicates that a first transport block is for retransmission, wherein the first transport block is transmitted in an unicast transmission mode, and the first transport block is for retransmission of a transport block transmitted in a multicast transmission mode;

receive, based on the scheduling information, the first transport block from the network device;
determine a first hybrid automatic repeat request (HARQ) process identifier of the first transport block; and
determine a first HARQ process based on the first HARQ process identifier;
allocate the first transport block to the first HARQ process.

8. The communication apparatus according to claim 7, wherein the programming instructions, when executed by the one or more processors, cause the communication apparatus to:
set a corresponding soft buffer for the first HARQ process.

9. The communication apparatus according to claim 7, wherein the scheduling information is scrambled by a cell radio network temporary identifier (C-RNTI).

10. The communication apparatus according to claim 7, wherein the programming instructions, when executed by the one or more processors, cause the communication apparatus to:
submitting first transport block to a logical channel or a radio link control (RLC) entity that receives multicast data.

11. A communication apparatus, comprising:
one or more processors, and
one or more memories coupled to the one or more processors and storing programming instructions for execution by the one or more processors to cause the communication apparatus to:
send scheduling information for determining a first hybrid automatic repeat request (HARQ) process identifier, wherein the scheduling information comprising a second indication information, wherein the second indication information indicates that a first transport block is for retransmission, wherein the first transport block is transmitted in an unicast transmission mode, and the first transport block is for retransmission of a transport block transmitted in a multicast transmission mode; and send, based on the scheduling information, the first transport block.

12. The communication apparatus according to claim 11, wherein the scheduling information is scrambled by a cell radio network temporary identifier (C-RNTI).

* * * * *

UNITED STATES PATENT AND TRADEMARK OFFICE
CERTIFICATE OF CORRECTION

PATENT NO. : 12,316,463 B2
APPLICATION NO. : 17/890053
DATED : May 27, 2025
INVENTOR(S) : Bin Xu, Bingzhao Li and Lei Chen Page 1 of 1

It is certified that error appears in the above-identified patent and that said Letters Patent is hereby corrected as shown below:

In the Claims

In Column 39, In Line 20-26 (Approx.), In Claim 5, delete "second indication information, wherein the second indication information indicates that a first transport block is for retransmission, wherein the first transport block is transmitted in an unicast transmission mode, and the first transport block is for retransmission of a transport block transmitted in a multicast transmission mode; and" and insert the same on Column 39, Line 19, as a continuation of the same subpoint.

In Column 40, In Line 4, In Claim 7, after "block;" delete "and".

In Column 40, In Line 6, In Claim 7, after " identifier;" insert -- and --.

In Column 40, In Line 33-38 (Approx.), In Claim 11, delete "second indication information, wherein the second indication information indicates that a first transport block is for retransmission, wherein the first transport block is transmitted in an unicast transmission mode, and the first transport block is for retransmission of a transport block transmitted in a multicast transmission mode; and" and insert the same on Column 40, Line 31, as a continuation of the same subpoint.

Signed and Sealed this
Thirtieth Day of September, 2025

John A. Squires
*Director of the United States Patent and Trademark Office*